United States Patent [19]

Wong et al.

[11] Patent Number: 5,631,745
[45] Date of Patent: May 20, 1997

[54] MULTI-FUNCTION TELECOMMUNICATIONS INSTRUMENT

[75] Inventors: John J. Wong, Atherton; Paul S. Lui, Saratoga, both of Calif.

[73] Assignee: Current Logic, San Jose, Calif.

[21] Appl. No.: 335,443

[22] Filed: Nov. 7, 1994

Related U.S. Application Data

[63] Continuation-in-part of Ser. No. 882,935, May 14, 1992.

[51] Int. Cl.⁶ .......................... H04N 1/00; H04M 11/00
[52] U.S. Cl. .......................... 358/434; 358/442; 358/444; 358/468; 379/88; 379/96; 379/100; 379/102; 379/105
[58] Field of Search ..................... 358/434, 479, 358/442, 468, 400, 402, 435–436, 438–440, 444, 404, 437; 379/100, 88, 37, 96, 105, 102, 67

[56] References Cited

U.S. PATENT DOCUMENTS

| | | | |
|---|---|---|---|
| 4,581,484 | 4/1986 | Bendig | 379/96 |
| 4,872,195 | 10/1989 | Leonard | 379/105 |
| 4,882,747 | 11/1989 | Williams | 379/102 |
| 4,885,766 | 12/1989 | Yasuoka et al. | 379/105 |
| 4,899,370 | 2/1990 | Kameo et al. | 379/105 |
| 4,935,951 | 6/1990 | Robinson et al. | 379/37 |
| 5,128,987 | 7/1992 | McDonough et al. | 379/102 |
| 5,253,313 | 10/1993 | Darbee | 379/102 |
| 5,347,305 | 9/1994 | Bush et al. | 379/96 |
| 5,412,710 | 5/1995 | Tanaka | 379/88 |
| 5,425,082 | 6/1995 | Sugino | 379/88 |
| 5,428,670 | 6/1995 | Gregorek et al. | 379/88 |
| 5,444,768 | 8/1995 | Lemaire et al. | 379/100 |
| 5,515,171 | 5/1996 | Nara et al. | 379/102 |
| 5,537,462 | 7/1996 | Utter et al. | 379/102 |

*Primary Examiner*—Edward L. Coles, Sr.
*Assistant Examiner*—Fan Lee
*Attorney, Agent, or Firm*—Majestic, Parsons, Siebert & Hsue

[57] ABSTRACT

A telephone terminal adapted for business or home use that includes the ability to receive and send facsimiles, a voice answering function and a computer modem. Various input and output devices may be used for the facsimile function. A voice annotated facsimile may be sent and received. At the same time the facsimile is viewed on a video monitor or ordinary television set, an accompanying voice message is heard through the sound system of the monitor or television set. The terminal has an architecture including a central processor and an internal bus structure to which several types of memory, various input-output devices and an interface with the telephone line are connected, among others. Audio Random Access Memory (ARAM) is used for storing both facsimile data and voice data.

32 Claims, 12 Drawing Sheets

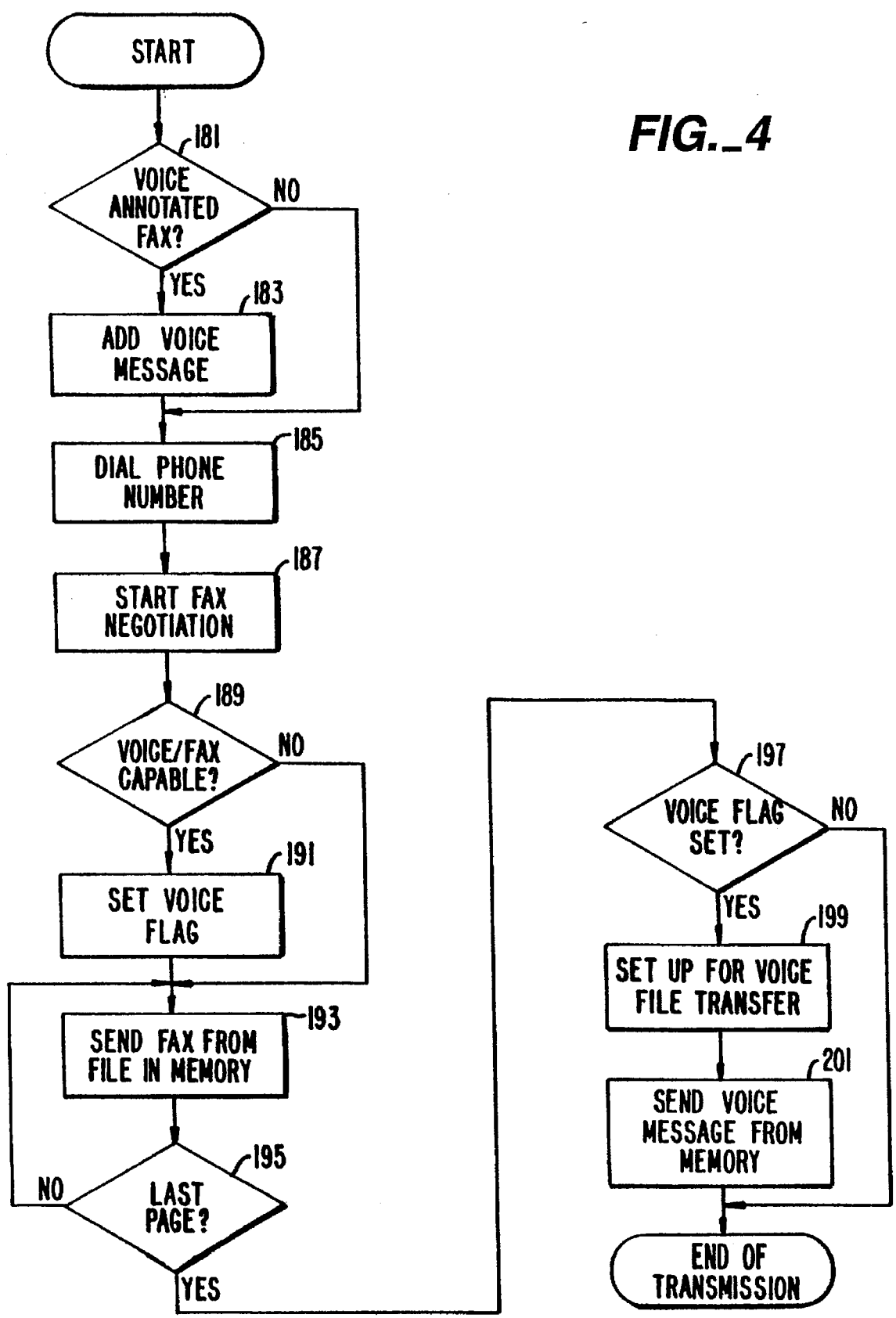
FIG._4

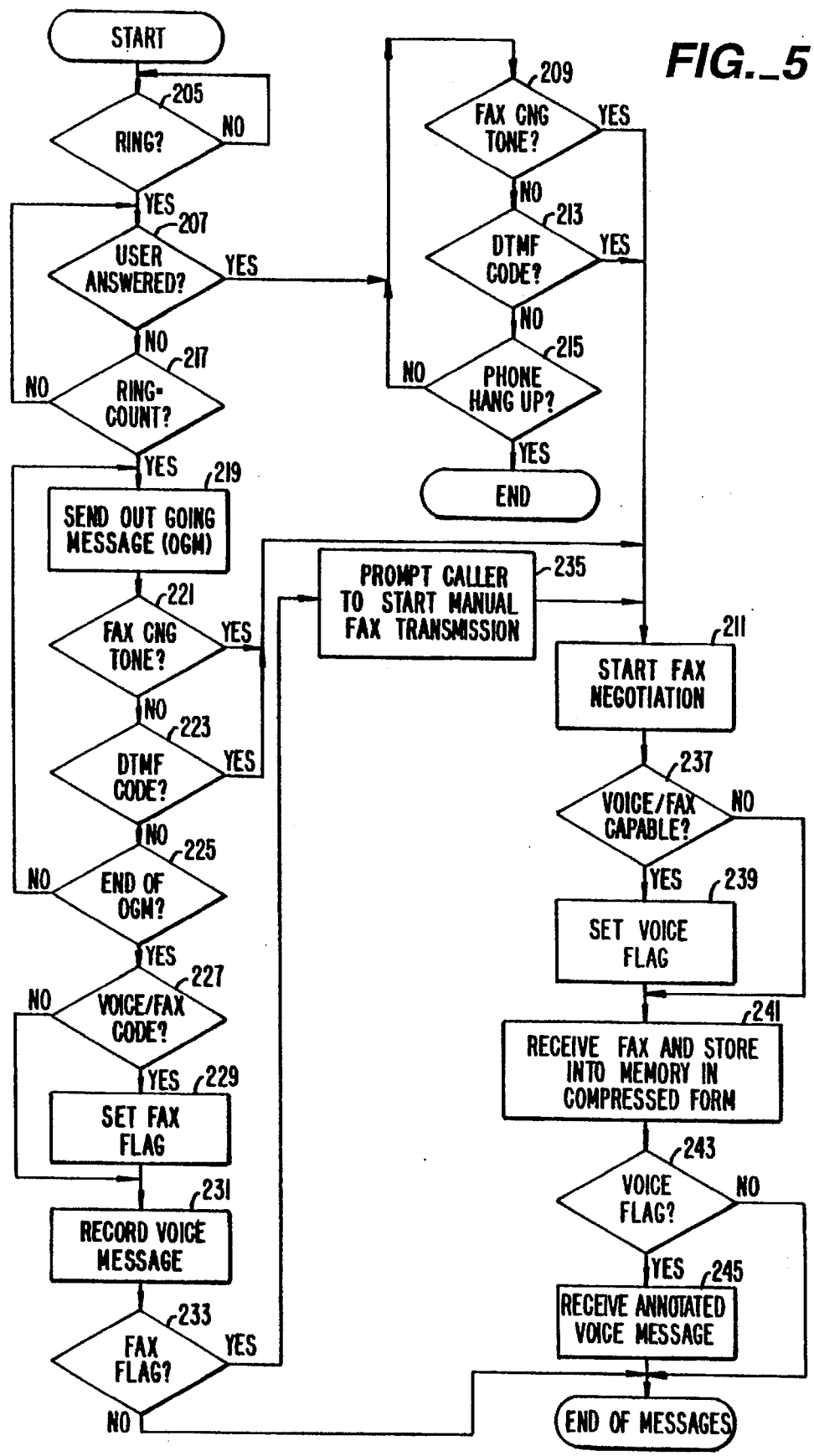
FIG._5

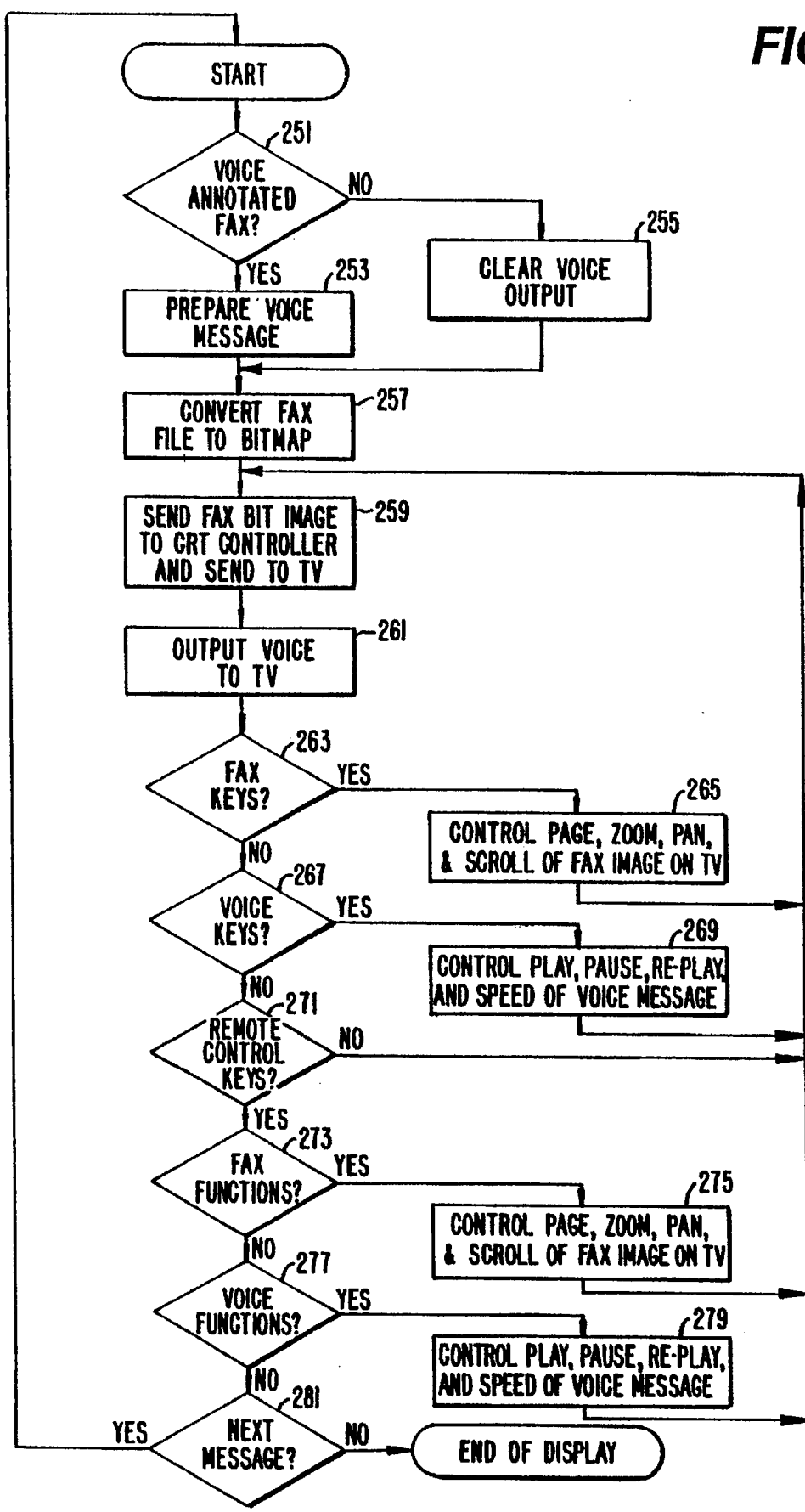
FIG._6

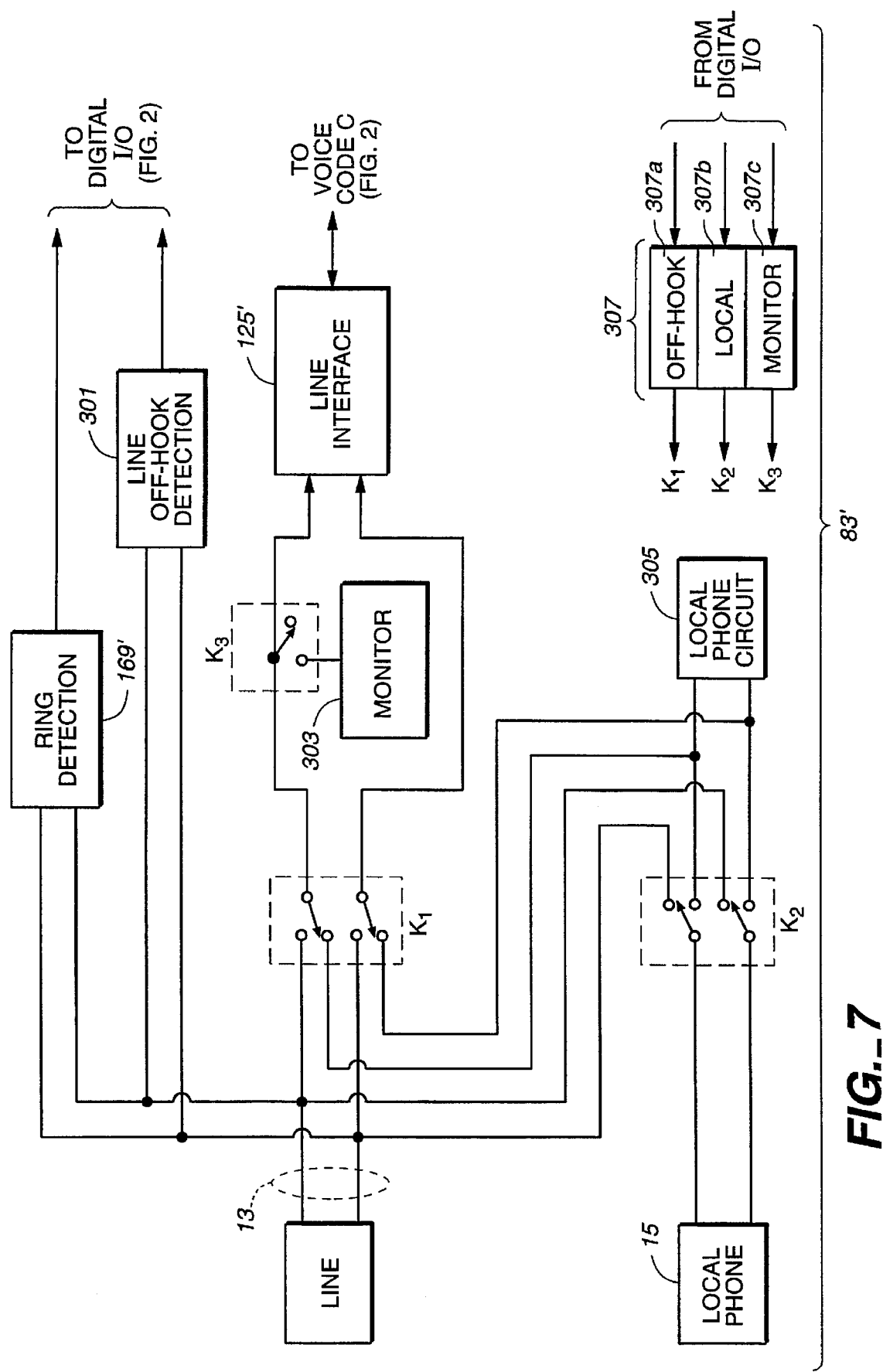
FIG._7

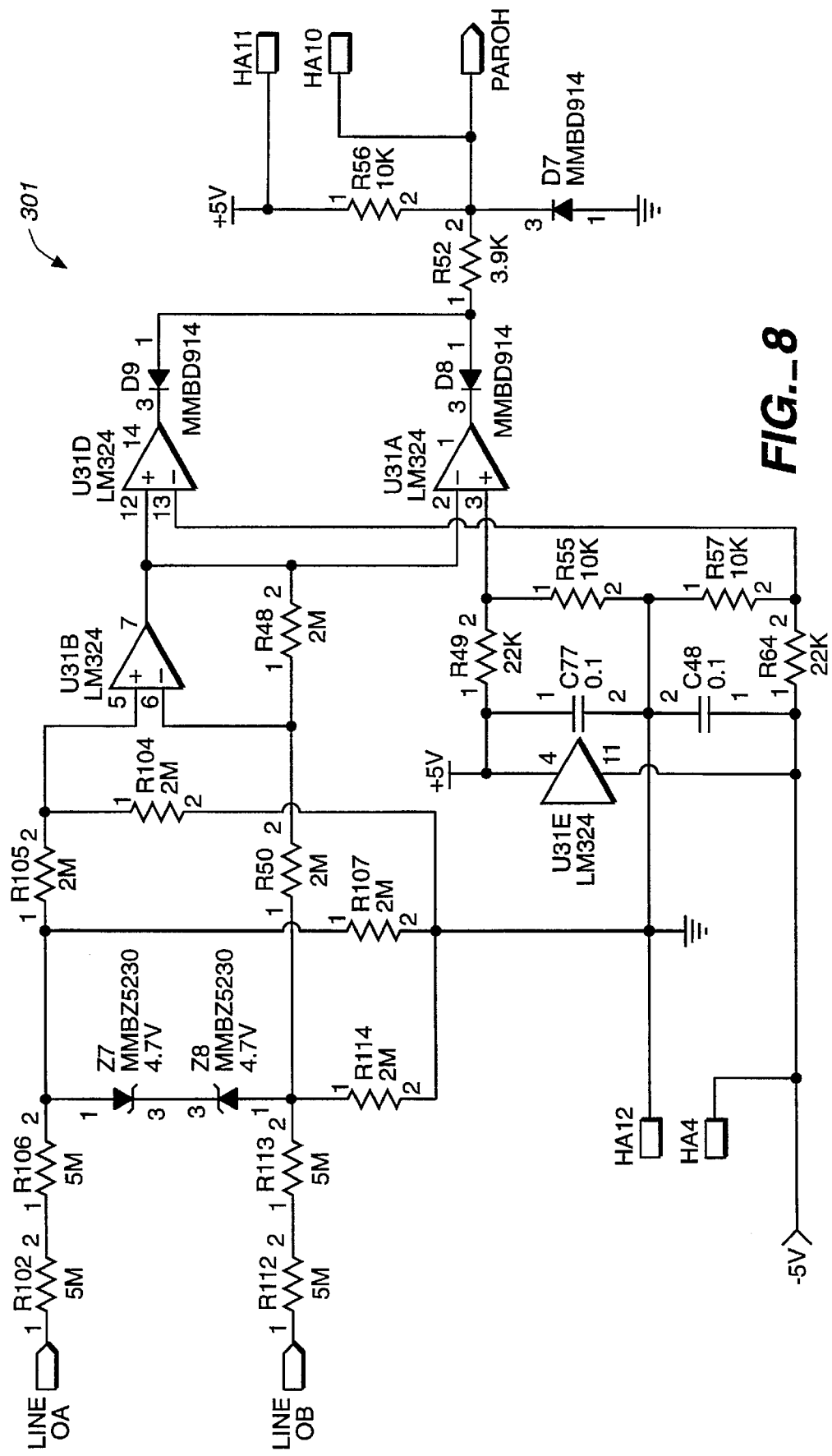
FIG._8

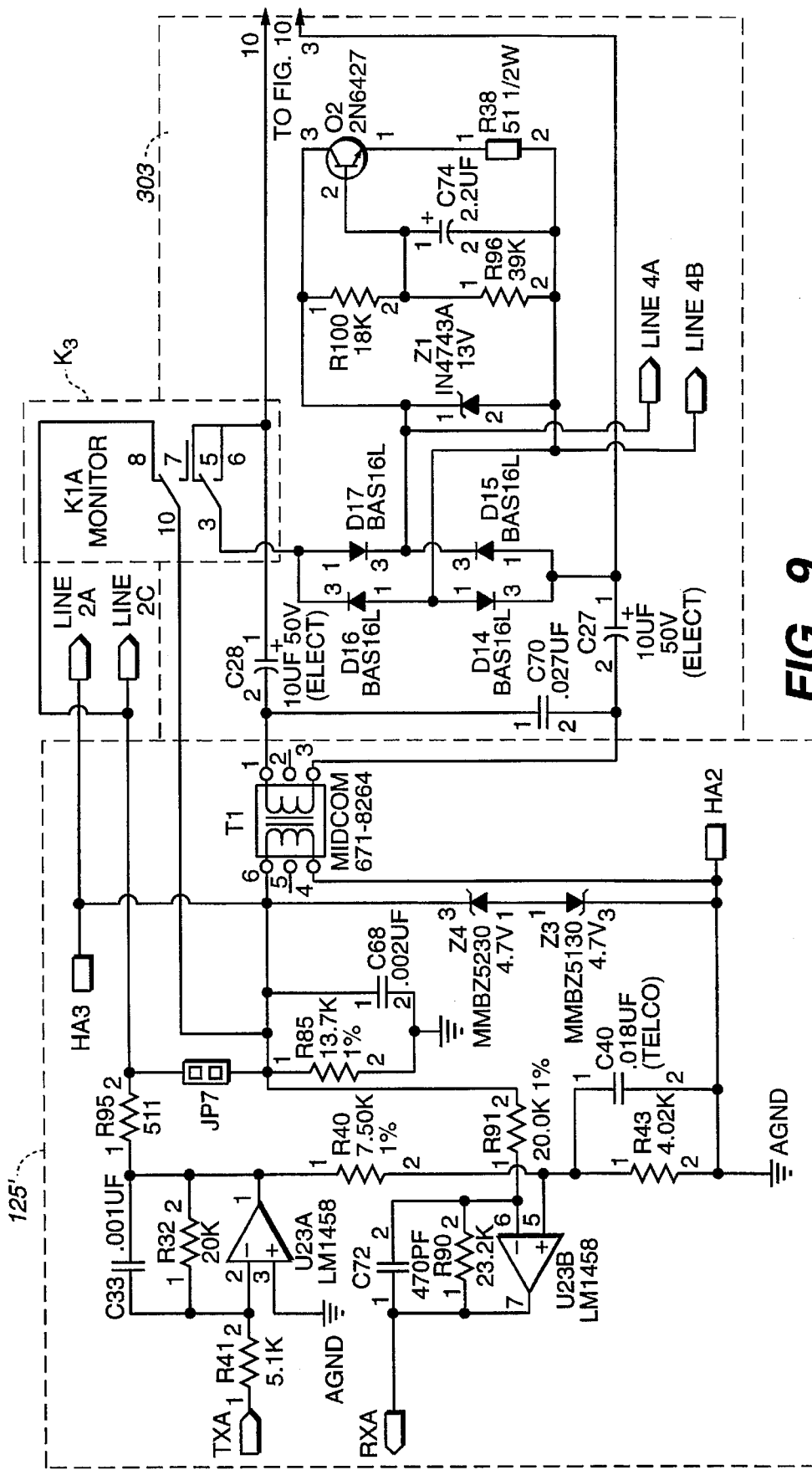
FIG._9

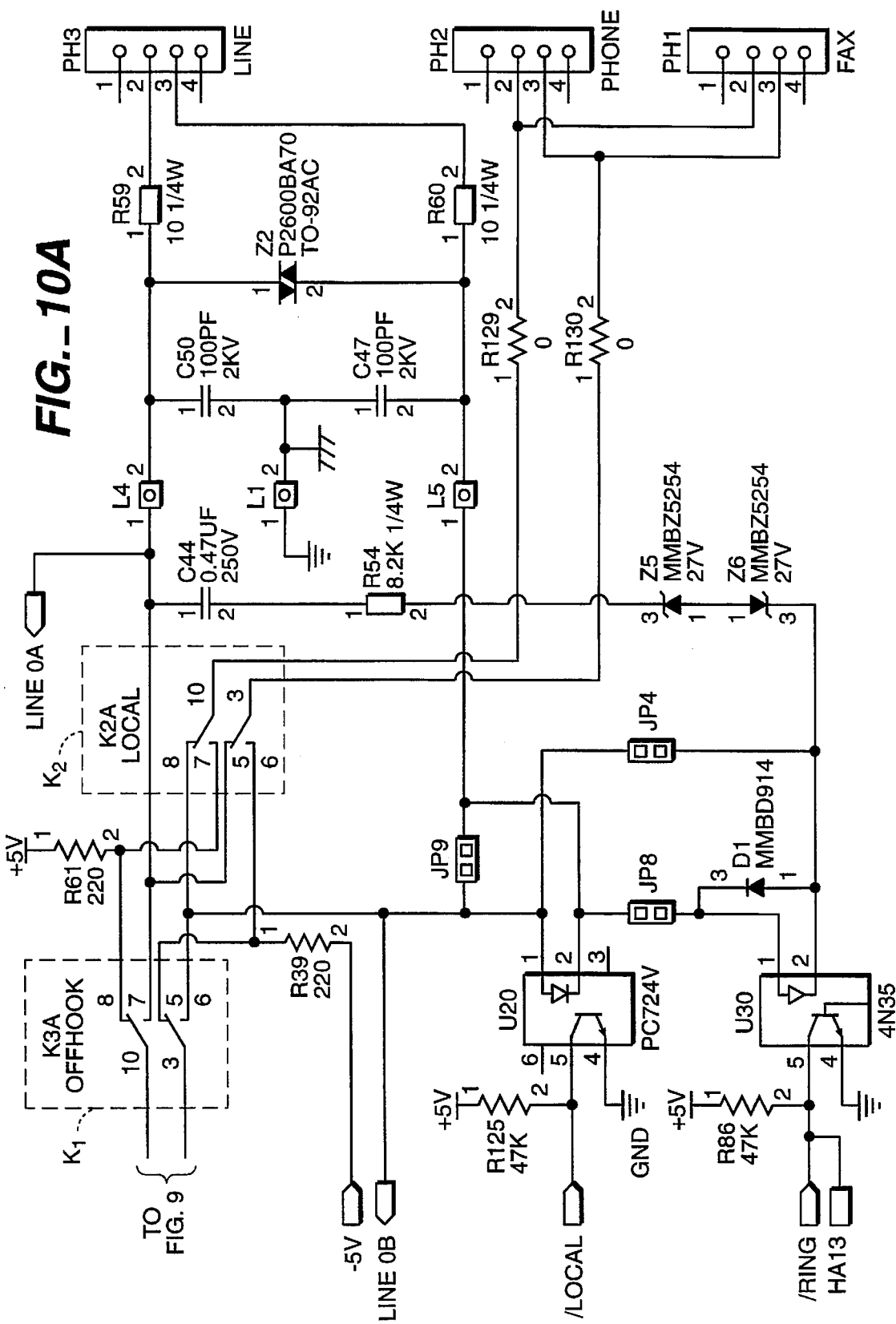
FIG.—10A

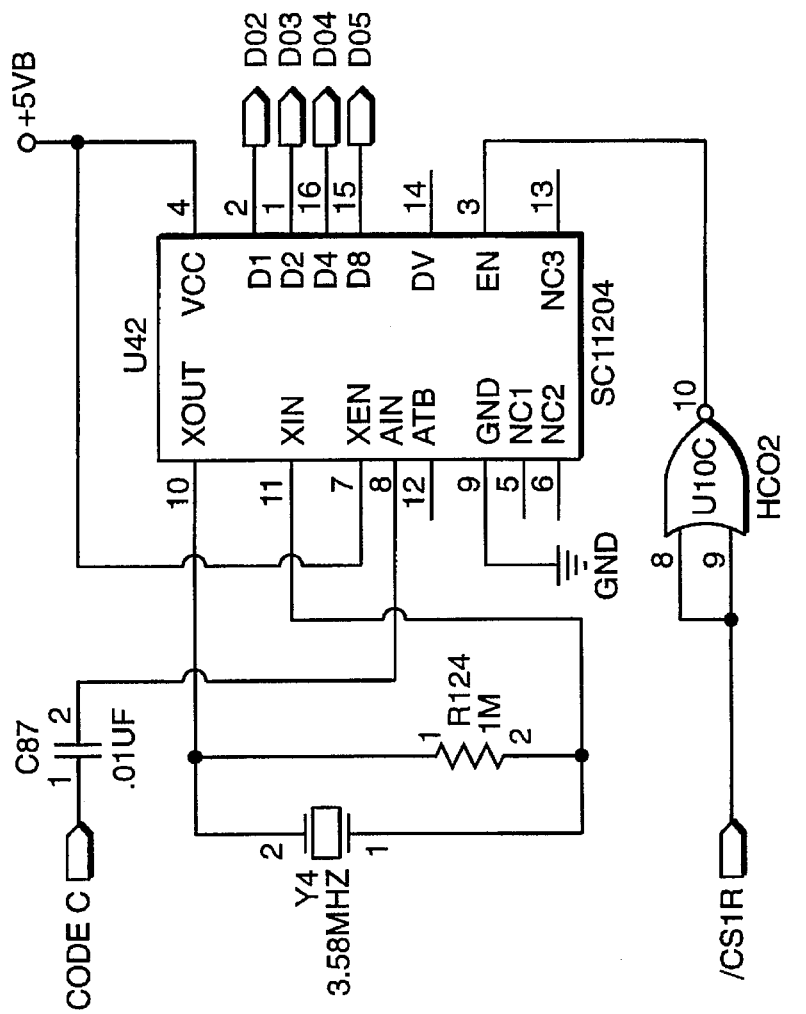
FIG._10B
FIG._10

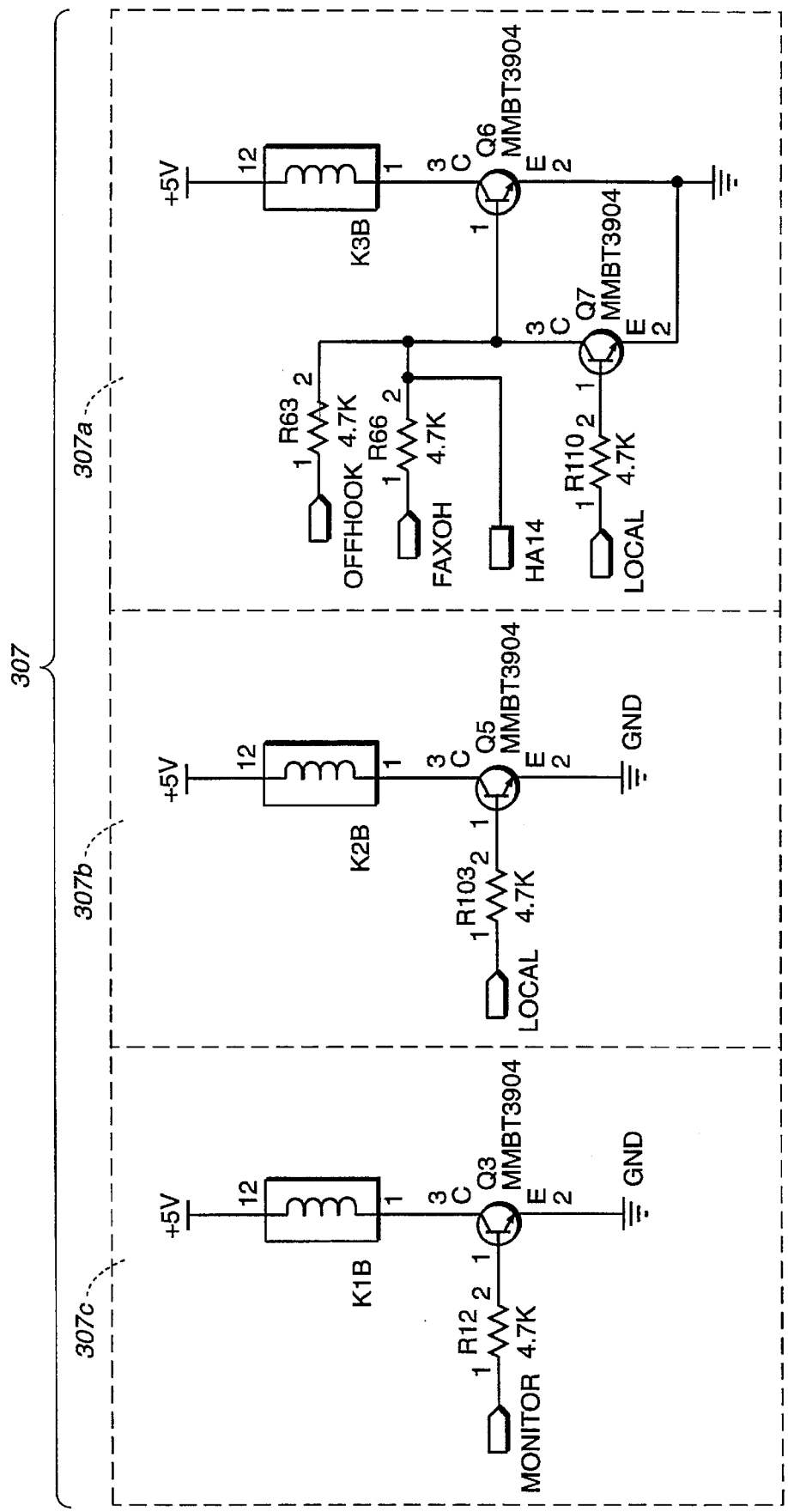
FIG._11

MULTI-FUNCTION TELECOMMUNICATIONS INSTRUMENT

This application is a continuation-in-part application of U.S. patent application Ser. No. 882,935, filed May 14, 1992, and has a common assignee.

BACKGROUND OF THE INVENTION

This invention relates generally to devices adapted for a communication over telephone lines, such as facsimile, modem, telephone answering, and similar types of devices.

The use of facsimile (fax) machines is currently exploding. Not only have such instruments found widespread use for the communication of business documents through the telephone system but private use between homes is also increasing. Similarly, the use of telephone answering machines for storing voice messages is also widespread in both businesses and homes. Further, the use of telephone lines for transmitting computer data is increasing, requiring a telephone modem at each end of the communication link.

Therefore, it is a primary object of the present invention to provide techniques for improving the usefulness and flexibility of use of such telecommunication functions.

SUMMARY OF THE INVENTION

This and additional objects are accomplished by the present invention, wherein, briefly and generally, a telecommunications terminal is provided for business or home use which integrates at least voice and fax functions, and optionally a computer data modem as well. The terminal automatically detects voice and fax in a single transmission and treats them either separately or together. According to a more specific aspect of the present invention, the telecommunications instrument is provided with circuits for connection to an ordinary television set for displaying a received fax on the screen. Accordingly to an even more specific aspect of the present invention, an ability is provided for playing a recorded voice message through a connected television set, or other similarly functioning device, at the same time that a stored fax is visually displayed on the television screen. All of this is accomplished by an instrument architecture, according to a preferred embodiment, that includes a single processor through which various input/output circuits, telephone interface line circuits, various forms of digital memory, and other necessary circuits are connected. Such an instrument is especially adapted for homes or small businesses where it is connected with a single telephone line and serves a single telephone handset, although it is not limited to such use.

In addition to the features described above, the telecommunications instrument of the present invention provides the following additional features and/or advantages. The instrument is a stand-alone voice and fax messaging unit. It is able to operate independently, without the need to communicate with a host computer or a host microprocessor. However, if desired, the unit is provided with the ability to communicate with a host computer system. Additionally, the stand-alone unit is small, compact, and portable, making the invention a powerful device designed to greatly enhance communication wherever the need may present itself.

One of the more powerful features of the telecommunications instrument of the present invention is the ability to forward faxes and to provide for remote fax retrieval. By programming the fax forward number, any received faxes can be sent directly to a phone number at any location. Remote retrieval allows a phone number to be programmed in so that the unit can call up and forward all the new faxes to it. Immediate on-line retrieval allows the faxes to be sent during the same telephone call. On-line retrieval is also useful for calling from fax machines or using portable computers. Fax logos and various select options are also programmable remotely. The unit is also provided with a pager notification feature. If a pager phone number is programmed and activated, it will be notified whenever a voice call or a fax call have been received by the unit. The pager will be alerted every time additional messages come in. A code at the end of the pager phone number indicates the number of voice and fax messages that is stored in the machine. Special codes for pause or wait for silence can be programmed to access the more advanced pager systems.

Another powerful feature of the telecommunications instrument of the present invention is the remote access feature. Through any touch tone telephone anywhere in the world, voice and fax messages can be easily accessible using this feature of the present invention. Remote access is initiated by calling the instrument and entering a security code. Once access is granted, the user has full control of the capability of the machine. Simple single digit commands give the user everyday functions, and two digit commands allows advanced features and systems set ups. Message retrievals, message recordings, fax selection, and system configuration can all be done remotely using the remote access feature of the present invention.

Additional objects, features and advantages of the various aspects of the present invention will become apparent from the following description of a preferred embodiment thereof, which description should be taken in conjunction with the accompanying drawings.

BRIEF DESCRIPTION OF THE DRAWINGS

FIG. 4 is a flow diagram showing operation of the telecommunications instrument of FIGS. 1–3 in a transmit mode;

FIG. 5 is a flow diagram showing operation of the telecommunications instrument of FIGS. 1–3 in a receive mode;

FIG. 6 is a flow diagram that shows the operation of the telecommunications instrument of FIGS. 1–3 to display a previously stored fax on a television screen, with or without playing back through the television sound system an accompanying stored voice message;

FIG. 7 shows an alternate embodiment of the data access arrangement (DAA) block of the system of FIG. 2, showing additional details not shown in FIG. 3;

FIG. 8 is a schematic diagram of the line off-hook detection circuit 301 of FIG. 7;

FIG. 9 shows a schematic diagram of the line interface block 125', the monitor circuit block 303, and switching circuit $K_3$ of FIG. 7;

FIG. 10, split into two figures, FIGS. 10A and 10B, shows a schematic diagram of additional circuitry within the data access arrangement diagram of FIG. 7; and FIG. 11 is a schematic diagram of the drivers 307 of FIG. 7 which are used to drive the switching circuits of $K_1$, $K_2$ and $K_3$.

DESCRIPTION OF A PREFERRED EMBODIMENT

Figure 1:
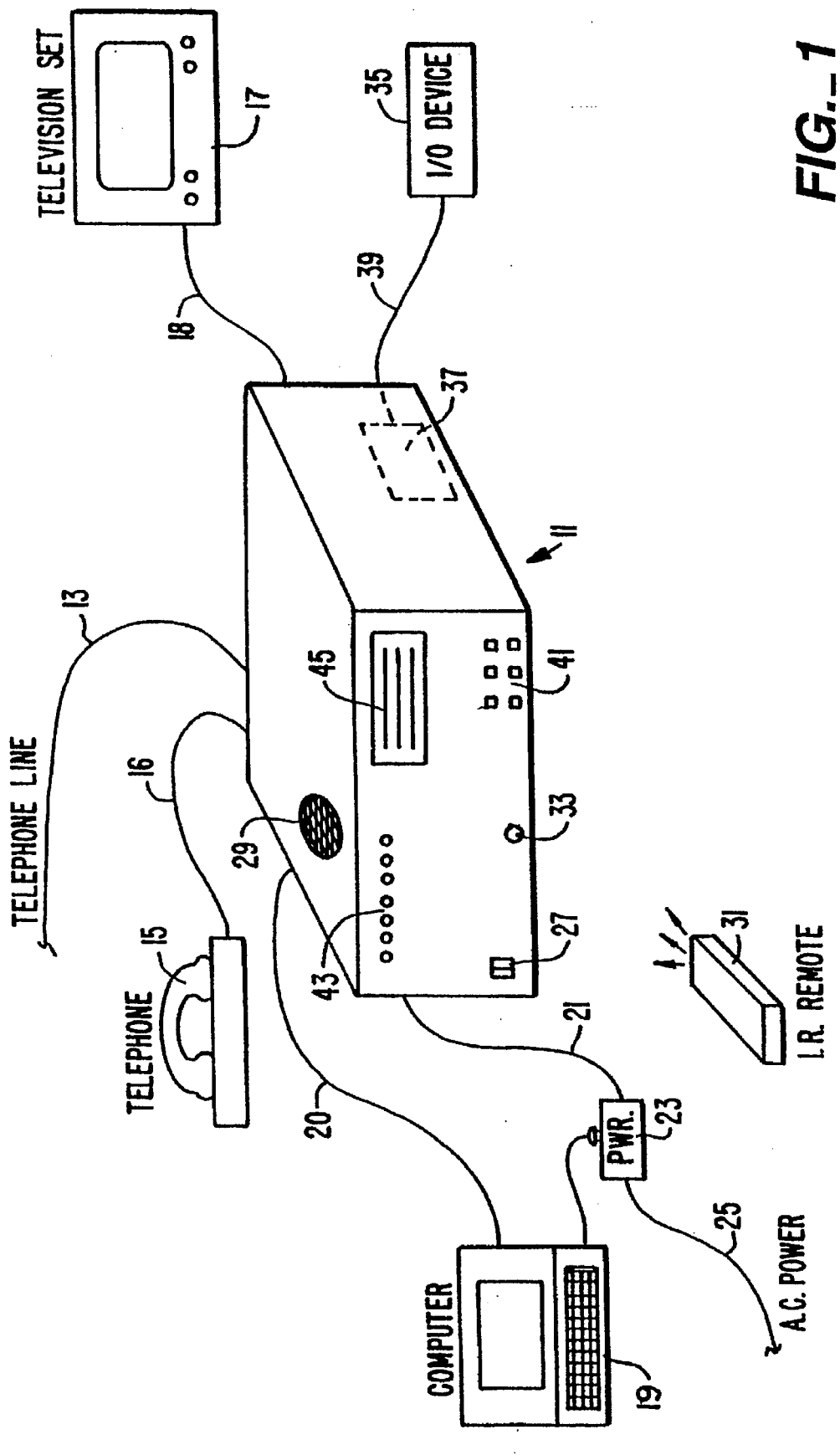
FIG. 1 shows, in general, various uses of the telecommunications instrument and terminal of the present invention.

Referring to FIG. 1, the general features of a telecommunications terminal or instrument 11 in accordance with the present invention will be described before proceeding to a detailed description of its hardware architecture and the software which controls it. At a minimum, the instrument 11 will be connected to a telephone line by a cable 13, such as one having a standard telephone jack at its free end. Depending upon the function to which the instrument 11 is to be placed, it will generally be connected to additional external devices. A telephone handset 15 will nearly always be used. In order to display received faxes, the instrument 11 is preferably connected with a standard television set 17 but can, alternatively, be connected with a standard computer system 19 for that purpose. The computer system 19, if utilized, can also provide other functions, such as storing on its hard or floppy disk drives telephone or fax data in excess of the amount that is stored by solid state memory within the instrument 11 itself. Since the instrument 11 also contains a modem circuit, the computer 19 can communicate digital data over the telephone line through the instrument 11 without having to have a separate modem.

The instrument 11, in this example, also provides a control signal in a line 21 to switch a power strip 23 on and off, in order to provide the capability of remotely connecting the computer system 19 to a power source 25. This allows the business or home user of the instrument 11 to remotely turn on or off the computer 19, or some other device, by telephone access. Further, this allows the instrument 11 to be configured to automatically turn on power to the computer 19 when a message memory is approaching its capacity.

A microphone 27 is built into the instrument 11 to allow recording of memoranda and outgoing telephone messages. A loudspeaker 29 is similarly provided as part of the instrument 11 as a means of playing back stored voice messages. The loudspeaker 29 can also be used to provide voice instructions to the user on how to operate the unit. The capability for use of a hand held remote control unit 31 is also optionally provided, by inclusion of an infra-red sensor 33 on a front panel of the instrument 11.

In addition to the telephone, television set and computer, provision is provided for connection of a number of additional types of input/output devices, if desired. Such an additional device 35 is provided with its own circuit card 37 with which it is connected over lines 39. In this example, provision is made for accepting up to three such printed circuit cards within the instrument 11, thus allowing up to three such additional input/output devices to be utilized at one time. One or more devices can be connected for providing an input of data to be sent by fax through the instrument 11 to a remote fax unit. These include a standard keyboard, a mouse, a scanner and a pen based tablet. A printer is another device that can be so connected in order to directly print out faxes. Another input/output card can be provided for connecting the instrument 11 to a computer network. The further card can be provided for remotely turning on and off electrical appliances, lights, and the like, which is especially useful for users that have the instrument 11 installed in their home. Additionally, an input/output circuit card can be provided for making the instrument 11 as part of a home security system by remotely dialing present numbers when security sensors are tripped, and/or responding to an inquiry from a remote location as to the status of such sensors. These are examples of readily available input/output devices but the instrument 11 is not limited to use with only this group of devices.

A group 41 of control switches of a standard type are provided on the front panel of the instrument 11. These provide appropriate user control of various functions, such as the following: power on/off, voice receiving and recording capability on or off, fax receiving capability on or off, to set a number of rings before the instrument 11 answers an incoming telephone call, loudspeaker volume control, the initiation and control of voice message playback, and the initiation and control of the playback of stored faxes.

Similarly, a group 43 of indicator lights, preferably light emitting diodes (LEDs), are included. An individual LED is provided to indicate one of many possible functions, such as whether power is connected to the unit, whether the voltage of internal backup batteries is low, whether there is a stored fax or not, whether there is a stored voice message or not, whether the telephone line to which the instrument 11 is connected is on or off hook, and similar functions.

In addition to the group 43 of LEDs, a liquid crystal display (LCD) 45 is optionally provided on the front of the instrument 11. Such a display may, for example, show two lines of 16 alpha-numeric characters each. It can provide various status messages such as the mode in which the unit is currently operating. In a standby mode, the time may be shown on one line and the number of both fax and voice messages that have been received on the other line, for example. The telephone number of a caller can also be displayed, where that is provided by the telephone company, and, if the instrument 11 includes a table of individual names associated with frequently received telephone calls, the caller's name can be displayed.

Figure 2:
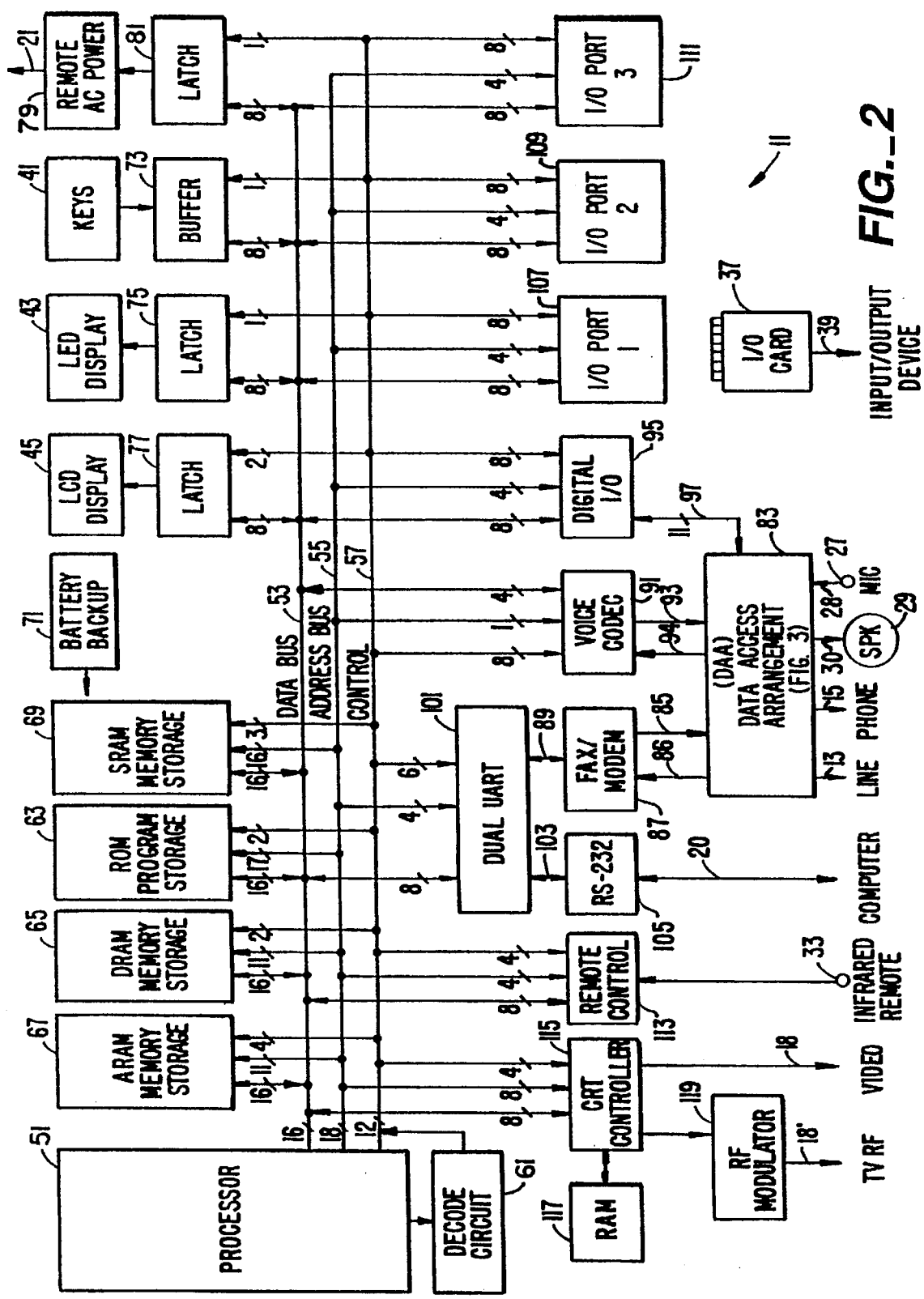
FIG. 2 is a schematic block diagram of the electronic system contained within the telecommunications instrument of FIG. 1.

With reference to FIG. 2, an example of an electronic architecture for the telecommunications instrument 11 is explained. A single processor 51 is connected to an internal bus structure including a data bus 53, an address bus 55 and a control bus 57. The processor 51 may be, for example, an integrated circuit product available from National Semiconductor under part number NS32AM160. This part combines a central processing unit (CPU) and a digital signal processor (DSP). The DSP portion of the processor 51 is dedicated principally to performing manipulations of voice data while the CPU portion is dedicated primarily to overall system control and the performance of various overhead functions. A separate decoding circuit 61 provides certain of the control signals of the control bus 57 from the CPU within the processor 51.

Several different types of memory are connected to the internal bus structure. A read only memory (ROM) 63 is a non-volatile type and holds the controlling program for the processor 51. A static random access memory (SRAM) 69 provides the data scratch pad and a place into which input/output programs can be stored for operating the I/O card 37 to drive a specific input/output device. Each such I/O card will contain a software driver for its input/output device and this could be accessed directly by the processor 51 but it is preferred to load the software from each such card into the SRAM 69 upon turning the power onto the device or otherwise resetting it. The processor 51 then uses the I/O card software that is stored in the SRAM 69. In order to avoid loss of information in the volatile memories 65, 67 and 69, a battery power source 71 is provided within the instrument 11. A low cost audio random access memory (ARAM) 67 is used for storage of voice and facsimile data.

One of the unique features of the present invention is the ability of instrument 11 to store received facsimile data in an internal ARAM memory array. As commonly known to those skilled in the art, ARAM memory chips are used primarily in applications where fault tolerant data (such as a digitized voice message) is to be stored. However, ARAM chips are not conventionally used to store fault non-tolerant data (such as a facsimile message) since the faulty memory cells within the ARAM chip cause the stored data to be corrupted. For audio applications, corruption of a small percentage of data is acceptable since the difference will likely be imperceptible to the listener. The same is not true for non-audio applications, however. For example, where facsimile data is concerned, it is important that none of the data be corrupted. For this reason, facsimile data is conventionally stored in DRAM.

Contrary to conventional techniques of storing facsimile data in DRAM, the present invention includes a software memory management technique for managing the storage and retrieval of data within an ARAM memory array such that both fault tolerant data (e.g. voice messages) and fault non-tolerant data (e.g. facsimile messages) can be stored within the ARAM array without such data becoming corrupted due to the faulty memory locations within the ARAM memory. The memory management technique of the present invention essentially maps out the bad memory locations of the ARAM memory array so as to prevent fault non-tolerant data from being stored in those locations. A more detailed discussion of the memory management technique of the present invention is presented in co-pending application Ser. No. 08/215,278 filed Mar. 21, 1994, herein incorporated by reference in its entirety.

It is to be noted that in an alternate embodiment, dynamic random access memory (DRAM) 65 may be used for storing facsimile and/or voice data.

The panel switches 41 are connected through a buffer circuit 73 to the internal bus. Similarly, the LED display 43 is connected to the internal bus through a latching circuit 75. Also, the LCD display 45, if utilized, communicates through a latching circuit 77 to the internal bus. The remotely controlled power signal in circuit 21 originates from a power circuit 79 that communicates with the system bus through the latch circuit 81.

A data access arrangement (DAA) circuit 83 communicates with the telephone line 13, the telephone handset 15 having connection 16, the speaker 29 through a circuit 30 and receives signals in a circuit 28 from the internal microphone 27. The DAA 83 communicates over lines 85 and 86 with a circuit 87 that handles fax and computer data. The circuit 87 may be, as an example, implemented by an available Rockwell 9624AC integrated circuit chip set. Another circuit 91 processes voice signals received from the DAA in analog form on a line 94, and also sends voice signals in analog form over the line 93. The circuit 91 includes both a digital-to-analog converter to translate a digital signal on the system bus to one in analog form on the line 93, and an analog-to-digital converter to translate an analog signal on the line 94 to one in digital form on the system bus. An example product that can be employed as the voice circuit 91 is a National Semiconductor CODEC integrated circuit chip, part no. TP5512. A digital control circuit 95 communicates between the system bus and the DAA 83 over circuits 97 in order to provide necessary control and supervision of the operation of the DAA 83 from the processor 51.

A circuit 101 is interfaced between the system bus and the connection 89 with the fax and computer data circuit 87. The circuit 101 is a universal asynchronous receiver/transmitter (UART) such as part number 16C452 available from Macronix, Inc., assignee of the present application. This part has two serial ports, one of which is connected to the circuits 89 and the other of which is connected through circuits 103 to another circuit 105 that interfaces the system with a computer over line 20 in an industry standard RS-232 format.

The system of FIG. 2 is provided with three sockets 107, 109 and 111 for receiving additional I/O cards, such as card 37, for connection to a specific input/output device of the types described previously. Each of these sockets is connected to selected lines of the internal system bus. They are part of individual slots which will accept a printed circuit card such as the I/O card 37, and thus allow the processor 51 to communicate directly with them over the system bus. As briefly mentioned previously, driving software for such an input/output device is generally stored in non-volatile memory on the I/O card 37 itself. This software is read from that card into the SRAM 69 upon power-up or other reset of the system. This one time loading the software from the I/O card 37 is accomplished by an 8-bit I/O transfer, thus reducing the number of pins necessary to have on the sockets and I/O cards. If the memory on the card were to be accessed directly by the processor 51 each time the card is used, additional pins would be necessary in order to provide a parallel connection with the I/O card memory in order for it to operate fast enough.

A circuit 113 is a standard remote control circuit for communicating pulses detected by the infrared sensor 33 and communicating them to the system bus. A cathode-ray tube (CRT) controller circuit 115 is also connected with the system bus and provides signals in the circuit 18 which can be connected directly to a monitor input of a standard television set or monitor. An amount of RAM 117 is provided for exclusive use by the CRT controller 115. In order to be able to operate with television sets that do not have a monitor input, a radio frequency (RF) modulator circuit 119 is included to modulate the video signal from the CRT controller onto a carrier that can then be connected by way of a circuit 18' to an antenna input of a standard television set.

Figure 3:
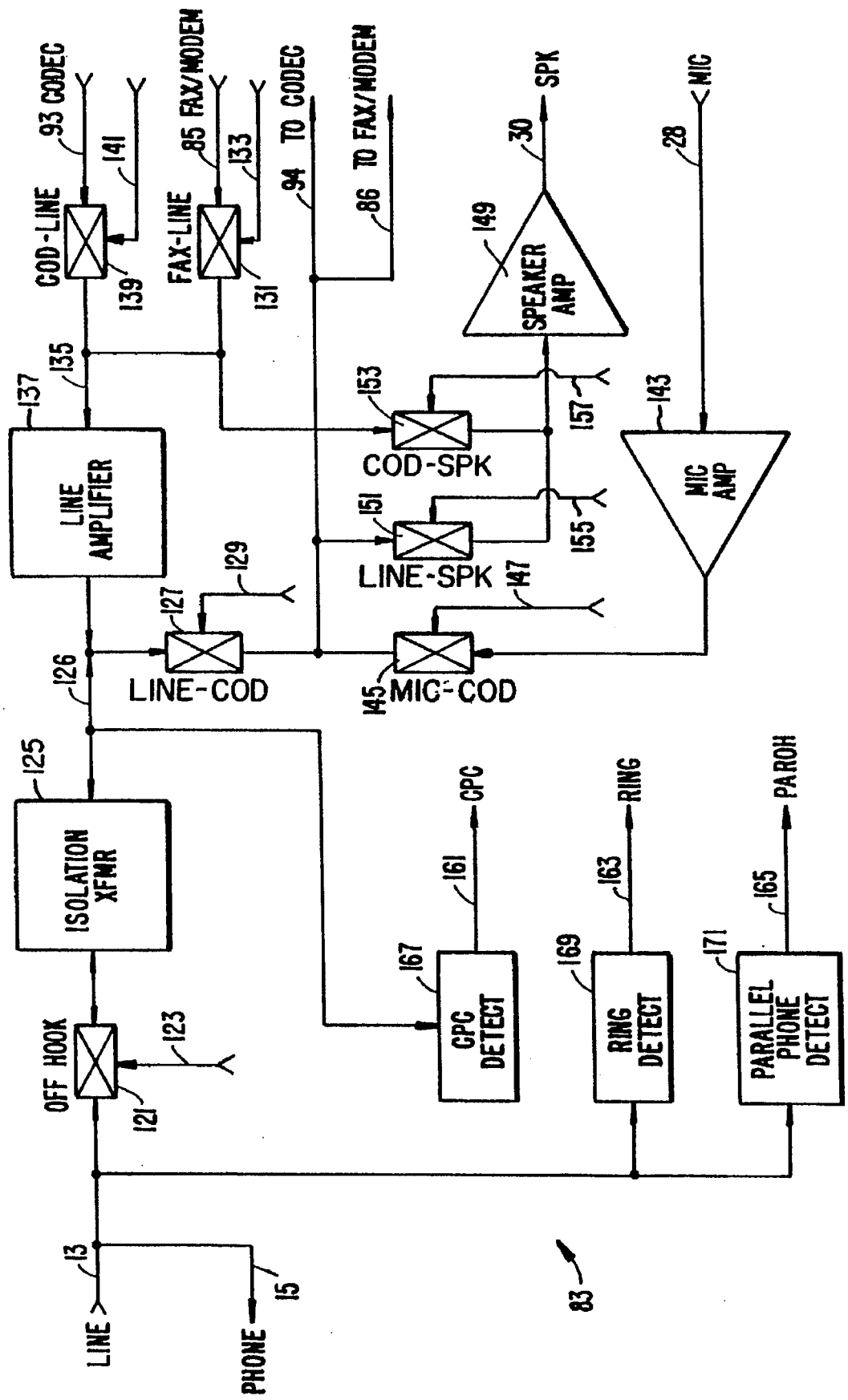
FIG. 3 shows additional details of the data access arrangement (DAA) block of the system of FIG. 2.

Referring to FIG. 3, the DAA circuit 83 is shown. A switch 121 is responsive to a control signal in a line 123 to controllably connect an isolation transformer 125 with the telephone line 13. Connected to an opposite side of the isolation transformer 125 is a switch 127 that toggles between on and off positions in response to a control signal in the line 129. When closed, a signal path is created that extends from the isolation transformer to the lines 86 and 94 for carrying analog signals to both the fax/modem circuit 87 and voice circuit 91 (FIG. 2). Data in analog form travels from the fax/modem circuit 87 (FIG. 2) through a switch 131 that, when closed in response to a control signal in a line 133, connects signals in a line 85 to a circuit 135 at an input of a line amplifier 137. An output of the line amplifier passes by way of the circuit 126 through the isolation transformer 125 and out on the telephone line 13 when the switch 121 is closed. Similarly, voice signals on line 93 from the circuit 91 (FIG. 2) are connected to the input 135 of the line amplifier 137 when a switch 139 is closed by an appropriate signal on a line 141. Closing of the switch 139 provides a similar connection of voice analog signals through the amplifier 137 and onto the telephone line 13, when the switch 121 is closed. Of course, only one of the switches 131 and 139 will be closed at one time. When one of them is closed, the switch 127 will generally be opened.

The microphone output in the circuit 28 is amplified by an amplifier 143 (FIG. 3), whose output is passed through another switch 145 to the switch 127. Thus, when the switch 145 is closed in response to a control signal in a line 147, the microphone can be connected through the line 94 to the voice circuit 91 (FIG. 2). When this occurs, the switch 127 will remain open. A microphone can then be used to record an outgoing message for the telephone answering function of the circuit of FIG. 2.

Similarly, the loudspeaker is driven through a circuit 30 from an amplifier 149 that has an input to which switches 151 and 153 are connected, being controlled by signals in respective lines 155 and 157. When the switches 127 and 151 are closed, the loudspeaker amplifier 149 is connected to the telephone line 13, assuming that the switch 121 is also closed. When the switches 153 and 139 are closed, the amplifier 149 has its input connected to the output line 93 of the voice circuits 91 (FIG. 2). This later connection allows the user to listen to a message or other voice information that is stored in the memory of the instrument. Only one of the switches 151 and 153 will be closed at a time.

Each of the switch control lines 123, 129, 133, 141, 147, 155 and 157 of FIG. 3 are part of the control lines 97 (FIG. 2) interconnecting the DAA circuit 83 with a digital input/output circuit 95. The state of each of these switches is individually controlled by the processor 51 which communicates controlling signals through the system bus and the digital input/output circuit 95. The circuits 97 connected to the digital input/output circuit 95 also include status signals in lines 161, 163 and 165. The processor can observe the status signals through the circuit 95 and the system bus of FIG. 2. The line 161 provides the processor 51 with a change in signal when a circuit 167 notes that the calling party has terminated the telephone call. The processor 51 then responds by terminating the current operation that depends upon that telephone connection being made. Similarly, a circuit 169 provides an indication in the line 163 when a ring signal is present on the telephone line 13. Finally, a circuit 171 provides in the line 165 an indication of whether the local telephone handset 15 (FIG. 1) is picked up or not.

The telecommunications instrument architecture, as described with respect to FIGS. 2 and 3, allows a wide variety of operations to be implemented, and in a number of alternative ways. The operational flow diagrams of FIGS. 4, 5 and 6 present one specific set of operational capabilities that combines the handling of voice and fax together.

Referring to FIG. 4, a first step in sending a fax is indicated by a step 181 wherein the CPU within the processor 51 is directed by its controlling program stored in the ROM 63 to interrogate whether the user has indicated by actuating an appropriate one or combination of the switches 41 that a voice is to be sent along with the fax. At this point, data of the fax is already present in the ARAM 67, having been stored there by an appropriate input source of a type described previously that is connected to one of the input/output ports 107, 109 or 111 (FIG. 2). The purpose of the step 181 is to indicate whether a voice message is to accompany the fax.

If a voice message is to be included, a step 183 indicates that a voice message is being recorded. For this, the CPU within the processor 51 closes the switch 145 (FIG. 3) while keeping all other switches within the DAA 83 open. The voice signal from the microphone 27 is then routed to the voice circuit 91 (FIG. 2) and a digitized version of the voice message stored in the ARAM 67.

A next step 185 is for the user to initiate the dialing of the remote phone number, either by reading out of memory or by operating the switches 41. Once connection with a remote system is made, standard fax identifying codes are sent and received so that the fax/modem circuit 87 (FIG. 2) has its parameters set to communicate with the type of instrument at the other end. One thing that is determined during this presending period, as indicated by another step 189, is whether the remote instrument is capable of handling voice and fax data together. That is, a determination of whether the same type of instrument as being described herein is present at the other end. If so, a flag is set in an appropriate register within the processor 51, as indicated by a step 191. If not, the step 191 is skipped.

In either event, as indicated by a step 193, the fax previously stored in the ARAM 67 is sent. The fax/modem circuit 87 (FIG. 2) receives the data and converts its data into appropriate tone signals in a line 85, while the DAA 11 (FIG. 3) has its switches 131 and 121 closed by the CPU within the processor 51 executing an instruction, the remaining switches of the DAA 11 remain open. The fax is continued to be sent until it has detected, as indicated in a step 195 of FIG. 4, that the last page has been sent.

After transmission of the fax has been completed, a next step 197 checks the CPU voice flag that would have been set in step 191 if it was determined during the pre-message communications with the opposing instrument that the instrument can handle both fax and voice data. If not, the previously recorded voice message is not sent, but rather the process ends. If the opposite instrument does have such a voice capability, however, as indicated by steps 199 and 201, the CPU within the processor 51 prepares for a binary file transfer of the digitized voice message from the ARAM 67 and sends that data through the fax/modem circuit 87 in a similar way as the fax binary data was previously sent from the ARAM 67. This method of sending a voice message avoids having to reconstruct an analog voice signal from the stored data before sending the message over the telephone line. Tones representative of the binary data are generated in the fax/modem circuit 87 sent over the telephone line and then directly reconverted into binary data at the opposite end and stored in its similar ARAM. Of course, the analog voice signal can alternatively be reconstructed for sending to a remote instrument that is not equipped to handle this protocol.

With reference to FIG. 5, operation of the system of FIGS. 2 and 3 for receiving a voice and/or fax message is described. In a first step 205, the CPU of the processor 51 responds to a ring signal in the line 163 (FIG. 3) to initiate a receive sequence. A next step 207 is for the CPU to determine, by monitoring the signal in the line 165 (FIG. 3) whether the telephone handset at the receiving instrument has been answered or not.

If the local handset has been picked up, a next step 209 causes a local instrument to be set to look for a fax identifying tone from the remote instrument. Such a tone is detected in the fax/modem circuit 87, which is connected to the telephone line 13 through switches 127 and 121 (FIG. 3) that have been closed while all other switches of the DAA 11 remain open. If such a tone is detected, operation proceeds to a step 211 wherein the two instruments pass pre-message identifying information back and forth. If such a fax tone is not detected in a step 209, however, a next step 213 can be provided for responding to a certain touchtone signal combination from the local handset in order to set the local instrument into a fax receiving mode by proceeding to the step 211. If such a code is not received, a next step 215 looks for the local user to have hung up the handset, as can be detected from the control signal in the line 165 (FIG. 3). So long as the fax tone is not received from the remote instrument and the local user does not provide an instruction through the touchtone pad of the local telephone, the operational loop of FIG. 5 including steps 209, 213 and 215 will continue until one of those three events occurs. While the CPU is in that loop, voice communication can be proceeding between the remote and local instruments. Of course, as indicated by the step 215, the hanging up of the instrument by the local user will cause that loop to be broken and terminate the receive routine by proceeding to its end.

In the case where the result of the inquiry in the step 207 is that the local user has not answered the telephone, a next step 217 allows the unanswered state to continue for a certain number of rings equal to a preset count. Once that preset count has been exceeded, the instrument automatically answers the call by connecting its system to send a pre-recorded message, as indicated by a step 219. That pre-recorded message is read from the ARAM 67, sent through the voice circuit 91 and then out into the telephone line 13 through the closed switches 139 (FIG. 3) and 121 of the DAA 83. While that message is being sent, which is a standard form of greeting that users of telephone answering machines pre-record, a loop of the steps 221, 223 and 225 occur. In the step 221, receipt of a fax tone from the remote instrument will cause the operation to proceed to the step 211, the first of the fax receiving steps. The step 223 indicates that if a particular predetermined touchtone code is received by the sender during this time, that the operation will also proceed to the step 211. Once the step 225 detects the end of the sending of the prerecorded greeting, however, this loop is terminated and the step 221 and 225 cannot occur.

After the end of the prerecorded greeting has been sent by the local instrument, a next step 227 looks for a predetermined touchtone code which, if received, causes a flag to be set in an appropriate register within the processor 51, as indicated by a step 229. That flag indicates that the remote instrument is sending a combined voice and fax message. Even though the normal fax carrier has not been received from the remote unit, this flag is set to indicate that a fax will be coming after a voice message. If the predetermined touchtone is not received in the step 227, that indicates that only a voice message is to be stored, the instrument thus providing the function of a telephone answering machine. In either event, as indicated by a step 231, the voice message is received and stored in the ARAM 67 through the voice circuit 91 and the DAA 11 with appropriate switches closed under control of the CPU within the processor 51.

After the voice message is completed, the next step 233 of FIG. 5 looks at the processor register fax flag bit to see if it has been set. If not, the receiving function is completed and it is terminated. If that flag is set, a next step 235 sends a prompt to the remote terminal for it to start to send a fax. After that, the first pre-message fax communication of the step 211 begins.

As part of the pre-message communication, as indicated by a step 237, it is determined whether the remote terminal has the capability of providing a voice annotated fax. If so, a voice flag bit is set in an internal register of the processor 51 (FIG. 2), as indicated by a step 239. After that flag is set, or if the remote terminal is determined not to have that capability, a next step 241 receives the fax through the DAA 11, with its switches appropriately set under processor control, and the fax/modem chip 87.

After the fax has been received and stored in the ARAM 67, it is determined in a step 243 whether the processor register voice flag was set in a step 239. If not, the processing ends. If that flag was set, however, the step 245 indicates that the voice message is to be received and stored in the ARAM 67. Since such a message will be transmitted from a like instrument at the remote location in tone encoded digital form, rather than as a full analog voice signal, those digital voice samples are decoded and stored directly in the ARAM 67. This avoids having to digitize the incoming voice signal. Rather, only the tones corresponding to specific digital values are converted into those values before storing in the ARAM 67.

It will be noted from FIG. 5 that the instrument 11 being described has the ability to record voice messages in two formats. The voice message received in step 231 is a standard voice analog signal that results from any handset, that signal being digitized by the circuit 91 and then stored in the ARAM 67. The second way of receiving voice, as indicated by the step 245 of FIG. 5, is in a special format where the voice annotates the accompanying fax. Since this comes from a similar type of instrument, this voice message can be transmitted and stored digitally, in the manner described above. In either case, the voice message may accompany a fax but in the first case the voice and fax are sent from a standard fax machine, while in the latter case, the voice and fax are sent by the type of instrument being discussed herein.

With reference to FIG. 6, one operation of the instrument 11 to display either a fax alone or a voice annotated fax is given. A first step 251 with respect to any stored fax is to determine whether it has a voice message that is to be played along with it. This is determined from a fax message log stored in one of the memories that is a usual directory listing all faxes that have been stored and received. As part of the information about each such fax is whether it is voice annotated or not. If it is, a next step 253 determines the address of the voice message in the ARAM 67. If there is no such voice message, a step 255 makes sure that no voice message is retrieved.

A next step 257 of the FIG. 6 process is to retrieve the designated fax from the ARAM 67, perform any decompression of the data that is necessary and convert the data into bit-map form which is then stored in either the ARAM 67 or SRAM 69, as desired. That bit-map version of the fax is then sent, in a step 259, to the CRT controller 115 (FIG. 2) and stored in its RAM 117. A next step 261 outputs the addressed voice message to the television, monitor or computer system on which the fax is being displayed and which can also audibly play the voice message.

As the fax is being displayed and the voice message reproduced, they may be manipulated. A next step 263 responds to any user activation of the panel switches 41 to perform various manipulations of the visual display, as indicated by a step 265. Similarly, another step 267 identifies whether the user is manipulating the panel switches 41 in order to alter the way in which the voice message is being played, and, if so, the functions indicated by a step 269 can be implemented.

The same user control can be performed by use of the remote control unit 31 (FIG. 1). If, in a step 271 it is determined that the remote control is being used, it is determined in a step 273 whether the user is requesting to manipulate the fax being displayed. If so, the manipulations are accomplished in a step 275. Similarly, a step 277 responds to user manipulation of the voice reproduction, by performing the requested manipulations in a step 279. After a fax or voice manipulation is performed by any of the steps 265, 269, 275 or 271, the processing returns to the step 259 to continue sending the fax to the CRT controller 115, usually one page at a time.

A next step 281, after completing the display of one fax and the playing of its associated voice message, if any, is to look for a command to display another fax that is stored in the ARAM 67. When such a request is received, the process begins again with the step 251. If such a request is not received, the fax display function ends.

The use of a television set has an advantage that the user may play back all stored faxes and voice messages through this one output device. This can be performed with the convenience of the remote control. In addition, information of the status of the terminal may be displayed. Example status information includes the number of stored messages, the time they were received, various instrument configuration information, caller identification, if available, and telephone accounting data, such as the length of a call and where a call was placed. Any other output device having video display and sound reproduction capability can be used instead of a television set, such as a personal computer with a multi-media capability.

FIG. 7 shows an alternate embodiment of the data access arrangement circuit of FIG. 3. Additional features and/or circuits have been included within the circuit of FIG. 7 which provides instrument 11 with the ability to perform a variety of novel functions which are not provided in today's conventional telecommunication devices.

For example, line off-hook detection circuit 301 provides instrument 11 with the ability to detect when any of the parallel phones on the phone line go off-hook. This allows the instrument 11 to check the line condition before it performs any of the forwarding functions (described below). It also allows instrument 11 to detect the presence of an off-hook phone and to start monitoring the line for special command codes related to local phone control and/or manual receive functions. A more detailed description of the off-hook detection circuit 301 is provided in FIG. 8, which shows a schematic diagram of one embodiment of circuit 301.

When instrument 11 detects an off-hook condition on the telephone line, it then enters a monitor mode to passively monitor the telephone line for command signals or CNG signals. The monitor circuit is depicted in FIG. 7 as circuitry block 303. The monitor mode is entered whenever the CPU detects that the line is off-hook. In the monitor mode, the instrument 11 is in a high-impedance mode monitoring only analog signals on the line. Any DTMF of other special signals can be detected and acted upon. A more detailed description of the monitor circuit 303 is illustrated in FIG. 9, which shows a schematic diagram of one embodiment of the monitor circuit 303.

While in the monitor mode, instrument 11 passively monitors the telephone line for a variety of command signals. When the CPU detects a predetermined command signal or code (which typically is comprised of a sequence of DTMF tones), instrument 11 will switch itself into a local mode. In the local mode, local access commands are operated by a local telephone 15 connected directly to instrument 11. While in the local mode, the local telephone can be used to control all of the operational features of instrument 11. Power to local telephone is supplied by the local phone circuit, illustrated in FIG. 7 as circuit block 305. It is to be noted that while in the local mode, instrument 11 and the local telephone are isolated from the telephone line by switching device $K_2$ (shown in FIG. 7). A more detailed description of the local phone circuit 305 and switching devices $K_1$ and $K_2$ is illustrated in FIGS. 10A and 10B which show a schematic diagram of one embodiment of the local phone circuit 305 and switching devices $K_1$ and $K_2$, as well as other circuitry within the Data Access Arrangement of FIG. 7.

The operation of the circuit of FIG. 7 will now be described. Initially, while nothing is happening, instrument 11 sits in an idle mode. In this mode, relays (i.e. switching devices) $K_1$, $K_2$ and $K_3$ are each in their respective off state, as shown in FIG. 7. Additionally, while in the idle mode, the ring detection circuit 169' is active and the off-hook detection circuit 301 is also active.

Shown in FIG. 7 are relay drivers 307a, 307b and 307c, collectively referred to as driver circuit 307. A more detailed description of each driver is provided in FIG. 11, which shows a schematic diagram of one embodiment of each of the respective drivers 307a–c. When the telephone line is detected as being off-hook by circuit 301, a signal is sent by the CPU to relay driver 307a, thereby turning on switching circuit $K_1$. The switching circuit $K_1$ allows instrument 11 and local telephone 15 to be connected to or isolated from the telephone line 13.

Additionally, when the circuit 301 detects the telephone line as being off-hook, another signal is sent by the CPU to relay driver 307c, thereby activating switching circuit $K_3$, which connects the monitor circuit 303 to the telephone line. Instrument 11 then enters a monitor mode, monitoring the telephone line for any DTMF or other special signals.

Upon the detection of a predetermined command signal on the line 13, instrument 11 enters a local mode, which allows the local telephone 15 to be used to control the various functions of instrument 11. When the predetermined code for the local mode is detected by the monitor circuit 303, the CPU sends a signal to relay driving circuit 307b, thereby causing switching circuit $K_2$ to connect local phone 15 to the local phone circuit 305, and isolating the local phone 15 from the line 13. One advantage of this feature of the present invention is that, while in local mode, instrument 11 is able to detect and respond to command signals issued by the local telephone 15 regardless of whether or not a connection is established over line 13 between local phone 15 and a remote calling party.

In the prior art, a remote telephone device can be used to remotely control or operate a telephone answering machine, however, in order to do so, a connection between the calling party and the machine must be established and remain established. If the calling party hangs up, conventional telephone answering machines will detect the disconnection, and revert back into their respective idle modes. Thus, while the answering machine is not connected to a call from an outside party, conventional machines do not monitor the telephone line in order to respond to command signals on the line.

In contrast, the present invention provides the ability to allow instrument 11 to be remotely controlled from any local telephone connected in either series or parallel to the telephone line, regardless of whether a connection has been established between instrument 11 and a remote caller over the phone line. Thus, for example, if instrument 11 is located in one location of a household, a user could pick up a telephone connected to the same line in another part of the household and enter a special code on the telephone line to cause instrument 11 to enter its local mode, whereby the unit may then be remotely controlled by the user by responding to other command signals generated by the user through the telephone.

Additionally, when local telephone 15 is used to remotely control instrument 11 while in the local mode, instrument 11 may be programmed and/or operated by local telephone 15 while the telephone line 13 is on-hook. This is because instrument 11 isolates local telephone 15 from the phone line 13 while in local mode. Thus, while local phone 15 is being used to program/operate instrument 11 in the local mode, incoming or outgoing telephone calls may be received or placed via a parallel phone connected to line 13.

Table 1 summarizes the states of the various switching devices $K_1$, $K_2$, and $K_3$ during the various modes of instrument 11.

TABLE 1

| MODE | SWITCHING DEVICE | | |
| --- | --- | --- | --- |
| | Off-Hook ($K_1$) | Local ($K_2$) | Monitor ($K_3$) |
| Off-Hook | On | Off | Off |
| Local | Off | On | On |
| Monitor | On | Off | On |
| Idle | Off | Off | Off |

OTHER FEATURES OF THE PRESENT INVENTION

In addition to the features described above, the telecommunications instrument 11 of the present invention provides the following additional features and/or advantages.

Instrument 11 is a stand-alone voice and fax messaging unit. It is able to operate independently, without the need to communicate with a host computer or a host microprocessor. However, if desired, instrument 11 has the ability to communicate with a host computer system. Additionally, the stand-alone unit 11 is small, compact, and portable, making the invention a powerful device designed to greatly enhance communication wherever the need may present itself.

Unit 11 has the ability to provide the plurality of outgoing messages (OGM). A first OGM is used for standard greeting messages. A default message preprogrammed into the unit can be played if the first OGM is not recorded. The second OGM is used for voice message forwarding purposes. The third OGM is used to play back if either the memory is full or if the announce only mode of the unit is activated.

Instrument 11 also has the ability to be subdivided into a plurality of individual and personal mailboxes. Individual OGM greetings and security codes as well as forwarding options are available separately for each mailbox. Mailbox 0 is a main default mailbox if no plurality of mailboxes are selected.

In addition to being a full-featured digital telephone answering machine, instrument 11 is also a full send and receive facsimile device. Received faxes can be printed or viewed in several ways. A local fax machine phone jack is provided to allow easy printing of faxes directly to any standard fax machine, without the need to send the facsimile data through the telephone line. Optionally, using a printer interface, any common printer can be used to print out a copy of the received fax. Additionally, using a TV interface, faxes can be viewed directly on any standard NTSC or PAL TV sets.

One of the more powerful features of the instrument 11 is the ability to forward faxes and remote fax retrieval. By programming the fax forward number, any received faxes can be sent directly to a phone number at any location. Remote retrieval allows a phone number to be programmed in so that the unit 11 can call up and forward all the new faxes to it. Immediate on-line retrieval allows the faxes to be sent during the same telephone call. On-line retrieval is also useful for calling from fax machines or using portable computers. Fax logos and various select options are also programmable remotely.

Instrument 11 is also provided with a pager notification feature. If a pager phone number is programmed and activated, it will be notified whenever a voice call or a fax call have been received by the unit. The pager will be alerted every time additional messages come in. A code at the end of the pager phone number indicates the number of voice and fax messages that is stored in the machine. Special codes for pause or wait for silence can be programmed to access the more advanced pager systems.

Another powerful feature of the instrument 11 is the remote access feature. Through any touch tone telephone anywhere in the world, voice and fax messages can be easily accessible using this feature of the present invention. Remote access is initiated by calling instrument 11 and entering a security code. Once access is granted, the user has full control of the capability of the machine. Simple single digit commands give the user everyday functions, and two digit commands allows advanced features and systems set ups. Message retrievals, message recordings, fax selection, and system configuration can all be done remotely using the remote access feature of the present invention.

Instrument 11 also has a call breakthrough feature. Call breakthrough is a feature which allow the caller to enter a special code, given by the user, to alert the user that an important call is coming in. When the code is detected, instrument 11 will simulate a phone ring to the speaker, even if the speaker is turned off. This allows the instrument 11 to handle all calls except the ones that are real urgent.

Each of these features will now be described in greater detail in the pages that follow.

Ring, Voice, Fax, and Command Signal Detection Functions

Instrument 11 can be connected in parallel with a plurality of telephones in a telephone communication system. When an incoming call comes in, all telephones connected to the same line will ring, including the local phone and the fax machine. The instrument 11 then starts monitoring the ring frequency and duration. When it meets the ring criteria, it is registered as a ring count. If the ring count matches the programmed ring count, depending on whether or not there are messages in the unit (toll saver feature), instrument 11 will answer the call. If any of the phones is picked up before instrument 11 answers, it will ignore the call. After instrument 11 answers the call, if any of the phones connected to the same line is picked up, instrument 11 will disconnect after 1 second delay.

After the instrument 11 answers the call, the first 4 seconds is spent monitoring the telephone line for a CNG tone from a remote fax machine. If the CNG tone is detected during that time, instrument 11 will go into fax receive mode. After the initial 4 seconds, the OGM message starts playing. Instrument 11 continues to monitor the line for either a CNG tone or a sequence of DTMF command signals during the OGM message. If the call is a voice call, the answering machine function will process the call accordingly, and store the message. If the caller is silent during the call, after a predetermined amount of time of silence (such as, for example, 7 seconds), instrument 11 will go into a fax answer mode to connect with manual fax calls or machines without CNG tones. If instrument 11 does not detect a voice or fax call, it will then ignore the message.

During the OGM message, the caller has the ability to bypass the message by depressing a specified key using a touchtone telephone. Once the signal from the specified key is accepted, instrument 11 will terminate the OGM and a beep will be heard. The incoming message recording will then commence.

If the call is manually answered by the user and during the call the user wishes to start receiving faxes, the user can press a MANUAL FAX RECEIVE button on instrument 11 to go directly into manual fax receive mode. Alternatively, manual fax receive can also be initiated during the call by keying in a predetermined sequence of DTMF tones from a touchtone phone, either by the caller or the user. As discussed in greater detail below, such a feature is possible because instrument 11 passively monitors the telephone line during the call in order to detect and respond to command signals comprising a sequence of DTMF tones.

Instrument 11 also provides the ability to detect the end of a phone call, and to disconnect itself from the telephone line when the call is over. For example, during a fax call, instrument 11 automatically handles the fax call and stores the received facsimile data into its memory. At the end of transmission, after the final EOP command, it disconnects the line. If there are any error conditions detected, or if the time-out duration for particular phase of fax transmission is reached, the unit will disconnect.

On a voice call, there are a number of ways for instrument 11 to detect a hang up condition, such as, for example:

1) When any parallel telephone connected to the same phone line is picked up.
2) When the incoming message exceeded the recording time limit.
3) When the phone line is silent for at least 7 seconds; in which case instrument 11 backs up the message so that only 2 seconds of silence is recorded.
4) When the instrument 11 detects a CPC signal. Note that some phone circuits generate a CPC disconnect signal when the caller hangs up, either in the form of a loop disconnect or line reversal. CPC detect can be disabled to avoid conflict with call waiting features. When the instrument 11 detects a BUSY tone. (Some phone circuits generates a BUSY after the caller hangs up.)
6) When the instrument 11 detects a DIAL tone. (Some phone circuits generates a DIAL tone after the caller hangs up.)
7) When the CLEAR button on instrument 11 is held down for at least 1 second. Instrument 11 completely stops and disconnects.
8) When instrument 11 detects a sequence of DTMF tones, signifying a special hang up command. (This is functionally similar to pressing the long CLEAR button.)

If the caller hangs up the phone shortly after the OGM is played, because they decided not to leave any messages, instrument 11 will process the call and disconnect the line on any of the above conditions. But if the message length is less than 2 seconds, instrument will delete the message to eliminate blank messages.

During an incomming telephone call, the ring signal is detected by an opto-isolator across the phone line through the proper RC networks. The detector presents the actual ring pattern to the CPU for interrogation. The CPU counts the number of pulses at an interval to determine the frequency and duration the ring and qualify the ring signal according to specific country parameters. The ring count is incremented on each successful detection. The ring count is compared against the ring count programmed and answers the call when they are equal.

Instrument 11 is also provided with a CPC detect feature. CPC is a Calling Party Control signal that is generated by some telephone company central office. Its purpose is to indicate that the calling party hangs up the line. This is done sometimes with a disconnect of loop current for duration of few hundred milli-seconds. Sometimes instead of a disconnect, the line voltages are reversed in polarity. The CPC detector in instrument 11 will detect the CPC in both cases. Some phone companies uses the same CPC signal to indicate the call waiting feature. The CPC detection can be turned ON or OFF by remote commands.

Instrument 11 can also detect various call progress tones. The standard tones are the dial tone, busy tone, and fax CNG tones. Some tones vary between different countries. Special tone tables are provided to allow tones to be easily programmable by firmware. In addition, DTMF tones are monitored to allow special access codes to be detected.

When instrument 11 is answering a call, if any of telephones connected to the same line as instrument 11 is picked up, the instrument 11 will automatically release the line and go ON-HOOK within 1 second, and will then switch to into its monitor mode. This allows the user to answer the call manually with any of the phones parallel to the circuit, while at the same time deactivating instrument 11. A parallel disconnect circuit detects the impedance of the phone going off-hook and signals the instrument 11 within 1 second of activation. Some telephone do not have the correct impedance characteristics, and instrument 11 may not detect them properly. In those special case, the user can force instrument 11 to disconnect by keying a predetermined command code from the telephone.

As described previously, instrument 11 has the ability to detect any of the phones on the line going off-hook. This allows the unit to check the line condition before it performs any of the forwarding function. It also allow instrument 11 to detect the phone off-hook and start monitoring for special access codes for local phone control or manual receive functions. Along with the off-hook detection capability, instrument 11 has the ability to go into a high impedance line monitor mode whenever the phones are off-hook. This feature allow instrument 11 to detect special access codes entered from the caller or from the user. Manual fax receive can be activated remotely from anywhere in the house or the office.

A built in local telephone interface circuit 305 and switching circuit $K_2$ (FIG. 7) allows direct connections between local phones and the instrument 11 unit. With the local connection, messages can be played back, remote command can be entered, and OGM messages can be recorded. The local telephone circuit 305 includes a ±5 volt supply with up to 20 ma. This works well with a majority of telephones and fax machine. Alternate embodiments are also contemplated for some speaker phones and older telephones that requires much higher voltages or line current.

For at least a majority of the forwarding functions, the instrument 11 dials the phone number using what is known as blind dialing. This is done to prevent possibilities of false detection of bad dial tones and busy tones. Since instrument 11 makes sure that the phone is not being used by monitoring the ON-LINE condition, it should be successful in getting an outside line access. In the case of busy conditions, instrument 11 will eventually time out and go into the retry mode.

Dial tone and/or busy tone detection is done using the DSP by measuring the presence of certain dial tone frequencies and certain duration. Since instrument 11 uses blind dialing for out going calls, the dial tone and/or busy tone detection is used for detection of line disconnect conditions.

Fax CNG tone detection is done using the DSP by measuring the presence of the CNG tone frequencies and certain duration. During the first four seconds of the answer period, CNG detection can be done accurately and instrument 11 will go directly into fax receive mode. After that period, any CNG tones detected is preferably verified 3 times before it is considered to be a valid CNG signal. This prevents normal voice speech to activate the fax mode. On fax machines that do not generate CNG tones, instrument 11 will try to handshake with the fax machine after the 7 seconds of voice silence period.

DTMF detection is done using the DSP by measuring the presence of the DTMF tone frequency pair and certain duration. Valid DTMF tones are used by the CPU to control many of the vital functions of instrument 11. During voice menu prompts and some playbacks of recorded messages, DTMF detection is more difficult than during normal silences.

Silence detection is done using the DSP by measuring the absence of signals below a certain level for a predetermined length of time. This silence level has been calibrated so that a low signal level conversation will not trigger the detector. A 7 second of silence is detected to terminate a call.

Voice Functions

Instrument 11 is a full featured digital answer machine. Incoming messages can be played back easily at the press of a an appropriate key or button. The message can be repeated, skipped, or deleted instantly with a press of a button. Messages that have not been deleted will remain in memory for instant access in the future. If new voice messages have been received, they will preferably be played first. Messages will be played in the order they were received, along with the time stamp. After the new messages have been played, old (or saved) messages may then be played, as the user desires. A CLEAR button provides a convenient way to delete the messages either during or after playing.

Three Out Going Messages (OGM) are provided in the unit. OGM1 is used for standard greeting messages. A default message, such as, for example, "No one is available to take your call, please leave your message after the tone." is played if the OGM1 is not recorded. OGM2 is used for voice message forwarding purpose. OGM3 is used to play back if either the memory is full or if Announce only mode is activated.

All messages can be retrieved remotely just as easily by calling the instrument 11 unit. Forward, repeat, and delete function are readily available with the touch tone keypad. Programming of OGM messages, call forward numbers, and record length are also provided.

On units with multiple mailboxes, the messages can be directed to 1 of 9 personal mailboxes. Individual OGM greetings and security codes as well as forwarding options are available separately for each mail box.

Voice message forwarding is a feature that can be enabled by entering a message forward number. It can also be disabled or enabled later without disturbing the phone number. Once enabled, after every voice message received, instrument 11 will dial the message forward number to inform the user that a message is available.

Instrument 11 utilize an extensive voice prompt database and a large vocabulary to help the user with the operation of the unit. Voice prompt is provided both with the push of the buttons and with remote access. The selection menu is fully guided with voice prompts to allow the user to operate even complex functions without a manual or reference card. There are two types of voice prompts. One is immediate feedback to indicate to the user the selection that he has made. The other is a help menu that is played if no selection is made after 3 seconds. This provides help to novice users when needed, without affecting experienced users. On number entries, each digit is repeat in voice prompt to confirm entries. There are also confirmation prompts for the accept and cancel keys. Help prompts are available even in sub-menus.

Fax Functions

Instrument 11 is also a full send and receive fax device. The automatic fax detection will handle all incoming fax calls, including manually placed calls, and stores the faxes into memory. Manual fax receive can be initiated by a press of a button.

Received faxes can be printed or viewed in several ways. A local fax machine phone jack is provided in instrument 11 to allow easy printing of faxes to any standard fax machine. With an optional printer interface, any common printers, such as, for example, EPSON, Bubblejet, or Laserjet compatibles can print out the faxes. Using a TV interface, faxes can be viewed directly on any standard NTSC or PAL TV sets.

One of the more powerful features of instrument 11 is the ability of instrument 11 to forward faxes and to provide remote fax retrieval. By programming a fax forward number, any received fax can be sent directly to a phone number at any location. This feature allows a phone number to be programmed in so that instrument 11 can call up and forward all the new faxes to it. The fax forwarding feature is similar to voice message forwarding. It can also be disabled or enabled later without disturbing the phone number. Once enabled, after every fax message received, instrument 11 will dial the fax forward number and send out the fax to the fax machine at the forwarded location.

Fax retrieval allows the user to call up instrument 11 and retrieval faxes that are stored in the unit. Fax retrieval is different than fax forwarding. Fax forwarding sends faxes to another number as the faxes are received, and fax retrieval sends it to the specified location on demand. There are two ways that the faxes can be retrieved. One is an immediate fax retrieval while ON-LINE and the other is fax retrieval to a fax retrieval number. Immediate On-Line retrieval allows faxes to be sent or received during a single, continuous telephone communication link with a remote party on the telephone line (i.e. during the same phone call). The On-Line retrieval feature is useful when calling from fax machines or using portable computers. Fax logs and various select options are also programmable remotely. In order to use immediate fax retrieval, the call is preferably made from a fax machine or a line with manual receive capability. Once activated, instrument 11 will start sending out new faxes during the same phone call. After successful transmission of the faxes, they will be marked as old faxes, but will remain in memory until it is deleted by the user.

Selection of faxes can be done using remote commands before the transmission. The default selection is all new faxes. This can be changed to fax log, all faxes, and specific faxes by fax numbers indicated in the fax log.

Another phone jack in the back of instrument 11 is provided for connection to a standard fax machine. This allows the fax printing locally without going through an outside phone line. The faxes can also be selectively printed through the use of remote command set by printing out fax logs first.

Pager Notification

If a pager phone number is programmed and activated within instrument 11, the pager will be notified whenever a voice call or fax call have been received. The pager will be alerted every time additional messages come in. A code at the end of the pager phone number indicates the number of voice and fax messages that is stored in the machine. Special codes for pause or wait for silence can be programmed to access more advanced pager systems.

Again, the pager notification feature is similar to both call forwarding and fax forwarding. Pager notification can be enabled by entering a pager notification number. It can also be disabled or enabled later without disturbing the phone number. Once enabled, after every voice or fax message received, instrument 11 will dial the pager number and send a sequence of touch tone codes.

On simple pager numbers, one phone number is entered. Some pager systems requires two parts, the phone number and the access number. If both numbers are necessary, the numbers should preferably be separated by a "@" symbol, for example, which adds 5 second of silence. Sometimes, it may be necessary to add extra "," to put in time delays in the number string. For example, one "," represents a 2 second delay. The user can put in additional number after the access code to identify the call if necessary.

If the pager number does not contain a "@" symbol, instrument 11 automatically adds it when it dials out the number. After the end of the pager number, instrument 11 adds two numbers "-xx" showing number of voice messages and a "-xx" showing number of fax messages.

Examples of special dial strings for phone numbers or pager numbers:

| | |
|---|---|
| , | 2 second delay |
| @ | wait for 5 seconds of silence |
| W | wait for dial tone |
| P | pulse dialing |

For example:

| | |
|---|---|
| 1. 3214567 | Simpler pager phone number |
| 2. 3214567@1234 | Pager phone number followed by an access number |
| 3. 3214567@1234,999 | Pager phone number followed by an access number followed by 999 which identifies the calling instrument 11 unit. |

Remote Access

Through any touch tone telephone anywhere in the world, voice and fax message can be easily accessible. Remote access is initiated by calling instrument 11 and entering a security code. Once access is granted, the user has full control of the capability of the machine. Simple single digit commands give the user everyday functions, and 2 digit commands allows advance features and system setups. Message retrievals, message recordings, fax selection, and system configuration can all be done remotely.

Remote access is initiated by entering a security code from any touch tone phone. The security code can be entered anytime before, during, and after the OGM message is played. Once the security is accepted, instrument 11 will acknowledge with a "accept" prompt followed by three short beeps. These three beeps is an indicator that instrument 11 is in the Main loop waiting for commands. In the main menu loop, after 3 seconds of inactivity, a voice prompt help menu will be played to guide the user through the command. During the main menu, single digit commands as well as double digit commands can be entered.

Local Phone Access

Through a local telephone connected to the back of the instrument 11, the user can also have access to the full function of the machine. The command set is identical to the remote access commands, offering same functionality and convenience. OGM's and Personal memos can be recorded through the local phone.

Local access comes in three forms: the local telephone, the local fax machine, and a parallel telephone anywhere in the house or office. Local access commands can be operated by through the local phone jacks in the back of the instrument 11 units, which includes the local telephone and the local fax machine. These local commands are identical to the remote commands, allowing powerful and flexible control of the instrument 11 unit locally. Fax setup and control can be done the same way to print out fax logs or selected faxes.

Security codes are not necessary to enable the local mode, but may be provided if desired. A local access code, however, is required. Normally, when a local phone 15 is picked up, a dial tone is received allowing direct access to the outside line. When an access code is entered, instrument 11 will switch from the outside line to the local mode. On a parallel phone in the system, special access codes allow manual fax transfers, message recording, and stopping of instrument 11.

A unique feature of instrument 11 allows control of instrument 11 functions from any phone connected to the line or by the calling party. This capability allows the manual fax receive, voice recording, and STOP functions from a remote location without touching the unit itself.

The following are examples of local access codes:

1—Local Telephone Mode

This command is used to connect either a local telephone or a local fax machine to instrument 11. After the ##1 code is accepted, instrument 11 responds with 3 beeps and it is ready to accept all remote access commands.

2—Local Fax Transmit Mode

Dialing ##2 from a local fax machine initiates a local fax transmit mode. The user is prompt to press the START button on the fax machine. After the document is loaded into the fax machine and the START button is pressed. The fax machine will send the document from the fax machine into instrument 11 for forwarding or retrieval purposes.

3—Manual Fax Receive Mode

This command operates when the phone is On-Line and it can be entered by either the calling party or the receiving party. Dialing ##3 will initiate a manual fax receive into instrument 11. This function is used when someone or a fax machine calls up and the call is manually answered by a person.

4—Message Record Mode

This command operates when the phone is On-Line and it can be entered by either the calling party or the receiving party. Dialing ##4 while the phone is on-line will initiate a two-way conversation recording mode. Instrument 11 will begin a message recording of the conversation until the end of recording limit.

5—STOP Instrument 11 Operations

This command operates when the phone is On-Line and it can be entered by either the calling party or the receiving party. Dialing a ##5 initiates a STOP command to the instrument 11, stopping any activities that the instrument 11 is doing.

IR Remote Control Access

An optional Infrared remote control unit allows the user again to have full control of the instrument 11, but at the comfort of an armchair. Once the remote is activated, the keys on the control unit simulates the same keypad layout as a touch tone function on a telephone set. This provides complete compatibility across different ways of accessing the instrument 11. The IR remote control unit is especially convenient when used along with the optional TV interface.

Infrared remote control offers the convenience of remote access to the instrument 11 unit without the need to use the local phone. All of the remote commands are supported on the IR remote key pad. To activate the IR remote session, press the IR ON key. This prevents any unnecessary or false triggering of the unit.

Additionally the IR remote control unit can be used to alter the image of a fax message being displayed on a television screen or monitor. The IR Remote control gives full control of the fax display including screen scroll, pan, zoom, sizing, fax page selection and viewing of fax logs. For example, the remote may be used to zoom in or out from a portion of the displayed message. Additionally, the remote may be used to scroll the displayed message up or down on the display device. Software within instrument 11 performs the manipulation of the display data necessary to allow these features to be implemented through the IR remote.

Power Fail and Recovery

Instrument 11 stores all voice and fax messages into its solid state memory devices. If there is any power failures or power interruptions, the data is held in the memory through the use of a 9 volt backup battery. When power is restored, instrument 11 checks the status of its internal memory and restores all parameters. On a fresh alkaline battery, the unit can hold data for over 12 hours. A low battery LED indicator shows that the battery is weak and should be replaced.

Although the present invention has been described with respect to a preferred embodiment thereof, it will be understood that the invention is entitled to full protection within the scope of the intended claims.

It is claimed:

1. A portable, stand-alone, multi-function apparatus for sending, receiving and storing facsimile data and voice data, said apparatus adapted to be connected to a telephone line, said apparatus being operable in a plurality of modes including a monitor mode, and an idle mode, said idle mode being indicative of a state wherein the telephone line is inactive, wherein said monitor mode allows the apparatus to passively monitor said telephone line in order to detect and respond to a plurality of predefined command signals on the telephone line which are generated from at least one local telephone device, said at least one local telephone device being connected in parallel to said apparatus via said telephone line, said apparatus comprising:

means connectable to said telephone line for receiving facsimile data of a document and storing it in binary form, means connectable to said telephone line for receiving a voice message and storing it in binary form, off-hook detector means connectable to said telephone line and operable in said idle mode for causing said apparatus to be in said monitor mode when said at least one local telephone device is detected as being off-hook, said detector means further being operable when no communication link has been established on said telephone line to a remote location; and remote telephone control means connectable to said telephone line and operable in said monitor mode for remotely controlling said apparatus in response to detection of a particular command signal of said plurality of predefined command signals on said telephone line, said remote control means further being operable when no communication link has been established connecting said telephone line to an outside caller location.

2. The apparatus of claim 1 wherein said facsimile data receiving means includes audio random access memory for storing at least a portion of said facsimile data.

3. The apparatus of claim 1 wherein said particular command signal is generated by said at least one local telephone device.

4. The apparatus of claim 1 wherein said remote telephone control means comprises control signal means for detecting said particular command signal on said telephone line, and for causing said apparatus to switch into a corresponding, particular mode of said plurality of modes in response to said particular command signal being detected.

5. The apparatus of claim 1 further comprising converting means connected to said voice and facsimile means for converting both the stored facsimile data and the stored voice message into at least one signal having a format that permits the facsimile data to be displayed and the voice message to be audibly reproduced by either a video monitor or television set.

6. The apparatus of claim 5 further comprising remote control means for remotely controlling at least some functions of the apparatus, said remote control means including display altering means responsive to at least one remote control signal for altering the appearance of said displayed facsimile data on said video monitor or television set, said display altering means including zooming means for zooming in on and out from a portion of said displayed facsimile data, and including scrolling means for causing said displayed facsimile data to scroll up and down.

7. A portable, stand-alone, multi-function apparatus for sending, receiving and storing facsimile data and voice data, said apparatus adapted to be connected to a telephone line, said apparatus being operable in a plurality of modes including a monitor mode, and an idle mode, wherein said monitor mode allows the apparatus to passively monitor said telephone line when at least one local telephone device is placed in an off-hook state, said local telephone device being connected in parallel to said apparatus via said telephone line, said apparatus comprising:

means connectable to said telephone line for receiving facsimile data of a document and storing it in binary form, means connectable to said telephone line for receiving a voice message and storing it in binary form, off-hook detector means connectable to said telephone line and operable in said idle mode for causing said apparatus to be in said monitor mode when said local telephone device is detected as being in said off-hook state, said detector means further being operable when no communication link has been established connecting said telephone line to an outside caller location; and monitor control means operable in said monitor mode for detecting a plurality of predefined command signals on the telephone line which are generated from said at least one local telephone device, and for causing said apparatus to switch into a particular mode of said plurality of modes in response to a corresponding, particular command signal being detected, said monitor control means further being operable when no communication link has been established connecting said telephone line to an outside caller location.

8. The apparatus of claim 7 wherein said facsimile data receiving means includes audio random access memory for storing at least a portion of said facsimile data.

9. A portable, stand-alone, multi-function apparatus for sending, receiving and storing facsimile data and voice data, said apparatus adapted to be connected to a telephone line, the apparatus further adapted to be connected via a communication path to a local telephone device simultaneously while the apparatus is connected to said telephone line, said communication path separate from said telephone line, the local telephone device being connectable to said telephone line via said communication path, the apparatus being operable in a plurality of modes including a local access mode which allows the apparatus to detect and respond to a plurality of predefined command signals on the separate communications line which are generated from said local telephone device, said apparatus comprising:

means connectable to said telephone line for receiving facsimile data of a document and storing it in binary form, means connectable to said telephone line for receiving a voice message and storing it in binary form, local access switching means connectable to said local telephone device for detecting a particular command signal on said communication path, and for causing said apparatus to be in said local access mode in response to said particular signal being detected;

said switching means including a switching device to isolate said local telephone device from said telephone line while maintaining said communication path between said apparatus and the local telephone device; and local access control means operable in said local access mode for detecting and responding to said plurality of predefined command signals generated by said local telephone device.

10. The apparatus of claim 9 wherein said facsimile data receiving means includes audio random access memory for storing at least a portion of said facsimile data.

11. The apparatus of claim 9 wherein said local access control means comprises means for detecting a particular command signal of said plurality of command signals on said telephone line, and for causing said apparatus to switch into a corresponding, particular mode of said plurality of modes in response to said particular command signal being detected.

12. The apparatus of claim 9 further comprising converting means connected to said voice and facsimile means for converting both the stored facsimile data and the stored voice message into at least one signal having a format that permits the facsimile data to be displayed and the voice message to be audibly reproduced by either a video monitor or television set.

13. A method for operating a portable, standalone, multi-function apparatus for sending, receiving and storing facsimile data and voice data, said apparatus adapted to be connected to a telephone line, said apparatus being connected in parallel to at least one local telephone device via the telephone line, said apparatus being operable in a plurality of modes including a monitor mode, and an idle mode, said idle mode being indicative of a state wherein the telephone line is inactive and the local telephone device is in an on-hook state, said monitor mode allowing the apparatus to passively monitor said telephone line in order to detect and respond to a plurality of predefined command signals on the telephone line which are generated from the local telephone device, said method comprising the steps of:

(a) switching said apparatus into said monitor mode in response to detection of said local telephone being in an off-hook state, said switching step being operable when no communication link has been established connecting said telephone line to an outside caller location;

(b) while in said monitor mode, passively monitoring said telephone line for said predefined command signals, said passive monitoring step being operable when no communication link has been established connecting said telephone line to said outside caller location; and (c) while in said monitor mode, remotely controlling said apparatus via said plurality of command signals generated by said local telephone device.

14. The method of claim 13 wherein said remotely controlling step (c) includes the steps of:

(c) detecting, while in said monitor mode, a particular command signal of said plurality of command signals on said telephone line; and (d) causing said apparatus to switch into a corresponding, particular mode of the plurality of modes in response to said particular command signal being detected.

15. The method of claim 14 further comprising the step of causing said apparatus to be in said idle mode when said telephone line is detected as being inactive and said local telephone device is detected as being in said on-hook state.

16. A method for operating a portable, stand-alone, multi-function apparatus for sending, receiving and storing facsimile data and voice data, said apparatus adapted to be connected to a telephone line, the apparatus further adapted to be connected via a communication path to a local telephone device simultaneously while the apparatus is connected to said telephone line, said communication path separate from said telephone line, the local telephone device being connectable to said telephone line via said communication path, the apparatus being operable in a plurality of modes including a local access mode which allows the apparatus to detect and respond to a plurality of predefined command signals on the communication path which are generated from said local telephone device, said method comprising the steps of:

(a) detecting a particular command signal of said plurality of command signals on said communication path;

(b) causing said apparatus to be in said local access mode in response to said particular signal being detected;

(c) while in said local access mode, isolating said local telephone device and said communication path from said telephone line while maintaining said communication path between said apparatus and the local telephone device;

(d) while in said local access mode, remotely controlling said apparatus via said plurality of command signals generated by said isolated, local telephone device over said isolated communication path.

17. The method of claim 16 wherein said remotely controlling step (d) includes the steps of:

detecting, while in said local access mode, a particular command signal of said plurality of command signals on said isolated separate communication path; and causing said apparatus to switch into a corresponding, particular mode of said plurality of modes in response to said particular command signal being detected.

18. In multi-function terminal adapted to be connected to a telephone communications line, a method for operating said terminal comprising the steps of:

(a) establishing a communication link over said telephone line between said terminal and a remote caller location, (b) receiving fault non-tolerant data of a document over said telephone line, and (c) storing said received fault non-tolerant data in audio random access memory (ARAM) without causing said data to be corrupted.

19. The method of claim 18 further comprising the step of:

(d) receiving fault tolerant data over said telephone line while said communication link is established, and (e) storing said fault tolerant data in binary form.

20. The method of claim 19 wherein said fault non-tolerant data is facsimile data related to a document, and said fault tolerant data is a voice message.

21. The method of claim 20 further comprising the step of converting both the stored facsimile data and the stored voice message into at least one signal having a format that permits the facsimile data to be displayed and the voice message to be audibly reproduced by either a video monitor or television set.

22. The method of claim 21 wherein said converting step includes the step of audibly reproducing said voice message simultaneously while said facsimile data is being displayed.

23. The method of claim 21 further comprising the step of linking a said stored voice message to a said stored facsimile data to thereby allow simultaneous voice annotation of said facsimile data while said facsimile data is being displayed.

24. The method according to claim 21 wherein said converting step includes the step of converting both the stored facsimile data and the stored voice message into a single signal.

25. The method according to claim 21 wherein said signal converting step includes the step of modulating said at least one signal onto a radio frequency carrier corresponding to that of an allocated television frequency, thereby providing a signal that can be connected to an antenna input of said television receiver.

26. The method according to claim 21 wherein said signal converting step includes the step of converting both the stored facsimile data and the stored voice message into composite video signals which can be connected directly to a monitor input of a television set.

27. In facsimile and voice storage and playback system adapted for connection with a telephone communications line, a method of operating said system comprising the steps of:

(a) establishing a communication link over said telephone line between said system and a remote caller location, (b) receiving facsimile data of a document over said telephone line, and (c) storing said received facsimile data in binary form in an audio random access memory (ARAM) array.

28. The method of claim 27 further comprising the steps of:

(d) receiving a voice message over said telephone line while said communication link is established, and (e) storing said received voice message in binary form in said ARAM array.

29. The method of claim 28 further comprising the step of converting both the stored facsimile data and the stored voice message into video and audio signals, respectively, whereby both facsimile and voice messages can be displayed on a single reproducing and displaying means.

30. The method of claim 29 wherein said converting step includes the step of audibly reproducing said voice message simultaneously while said facsimile data is being displayed.

31. The method of claim 29 further comprising the step of linking a said stored voice message to a said stored facsimile data to thereby allow simultaneous voice annotation of said facsimile data while said facsimile data is being displayed.

32. The method of claim 27 which additionally comprises the step of controlling operation of said system through electromagnetic radiation signals produced by a handheld remote control unit.

* * * * *